(12) United States Patent
Subbarao et al.

(10) Patent No.: US 8,433,654 B2
(45) Date of Patent: Apr. 30, 2013

(54) METHOD AND SYSTEM FOR PAYING DIRECTLY AT BILLER WEBSITES FROM WITHIN A BILL PAY WEBSITE

(75) Inventors: Murali B. Subbarao, Saratoga, CA (US); Shankar A. Chittoor, Fremont, CA (US); Allwyn B. Lobo, Campbell, CA (US); Sunil Regulagadda, San Jose, CA (US)

(73) Assignee: Billeo, Inc, Santa Clara, CA (US)

( * ) Notice: Subject to any disclaimer, the term of this patent is extended or adjusted under 35 U.S.C. 154(b) by 163 days.

(21) Appl. No.: 12/916,259

(22) Filed: Oct. 29, 2010

(65) Prior Publication Data

US 2011/0276414 A1 Nov. 10, 2011

Related U.S. Application Data

(60) Provisional application No. 61/333,023, filed on May 10, 2010.

(51) Int. Cl.
*G06Q 40/00* (2012.01)
(52) U.S. Cl.
USPC .......................................................... 705/40
(58) Field of Classification Search ...................... 705/40
See application file for complete search history.

(56) References Cited

U.S. PATENT DOCUMENTS

| | | | | |
|---|---|---|---|---|
| 7,814,012 B2* | 10/2010 | Johnson | ........................... | 705/40 |
| 8,112,354 B2* | 2/2012 | Lalwani et al. | .................. | 705/40 |
| 2006/0218088 A1* | 9/2006 | Flora et al. | ....................... | 705/39 |
| 2007/0038561 A1 | 2/2007 | Vancini et al. | | |
| 2007/0156581 A1 | 7/2007 | Imrey et al. | | |
| 2010/0005025 A1 | 1/2010 | Kumar et al. | | |

\* cited by examiner

*Primary Examiner* — Daniel Felten
*Assistant Examiner* — Clifford Madamba
(74) *Attorney, Agent, or Firm* — William L. Botjer

(57) ABSTRACT

A method and a system for performing an online payment related activity using a browser application. The browser application interfaces a bill pay website with one or more biller websites to which the online payment needs to be made. When a user logs-in to the bill pay website, the browser application is activated. The user then selects a biller from a list of billers pre-stored at the bill pay website. The browser application automatically navigates the user to a biller website of the selected biller, while concurrently maintaining a communication link to the bill pay website. The browser application then enters payment information on the one or more payment related web pages displayed at the biller website. After the online payment related activity is completed, and the user is navigated back to the bill pay website without the need for a user input.

43 Claims, 13 Drawing Sheets

METHOD AND SYSTEM FOR PAYING DIRECTLY AT BILLER WEBSITES FROM WITHIN A BILL PAY WEBSITE

FIELD OF THE INVENTION

The present invention relates, in general, to online payment related activities. More specifically, the invention relates to facilitating online payment related activities directly at biller websites from within a bill pay website.

BACKGROUND

Online bill presentment and payment solutions provide the capability to present bills from service providers (hereinafter referred to as "billing companies" or "billers") to customers and to facilitate bill payment by electronic means on the biller websites. Solutions for electronic payment include credit cards, debit cards, prepaid cards, and the Automated Clearing House (ACH) network. The ACH system includes direct deposit, direct debit and electronic checks (e-checks). Such electronic payment options on the biller websites offer an array of advantages, such as eliminating the costs associated with printing paper bills and reducing the delivery delays associated with other payment options, such as mailing a paper check to the billers or making a bill payment using ACH on a bill pay website, respectively.

In contrast to the electronic payment options provided by the billers, banks have built their services around a "consolidator" method for online bill presentment and payment. According to this service, a customer's bills are collected from multiple billers and are accumulated at a bank bill pay website. The customer is only required to log-in to the bank bill pay website, enter the biller's information, and authorize the bank to electronically transfer money or send a check via the US postal service from his/her account to pay each bill. Additionally, the customer can choose whether to do this manually for each billing cycle or have his/her bills automatically paid on a fixed day each month. A disadvantage of the "consolidator" method faced by the customers is that their payment option is limited only to the ACH accounts. Thus, the customers cannot utilize the "consolidator" model to make a payment via a credit card or a debit card issued by the banks. Another disadvantage is that the "consolidator" solution does not facilitate immediate payment of bills. Typically, it takes at least 2-5 days before the money is debited from the user's account and credited to the biller's account.

In addition to the above mentioned disadvantages, the "consolidator" model also poses a problem for the banks since more than half of the bank's bill pay customers also use a "biller-direct" method, i.e., they skip the bank website and go directly to the biller website to make the payments for their bills. Further, the banks are losing out on the potential for interchange revenues realizable through bill payments made with a credit card or a debit card.

Therefore, even though nearly all banks offer a bill payment solution, a majority of the households in the US still prefer to the "biller-direct" method. Further, the "biller-direct" method offers a large coverage area as there are over 16,000 biller websites, out of which over 11,000 biller websites accept a card as a payment option. Also, the biller websites typically accept multiple forms of card payments, including ACH, credit card, debit card, ATM card, etc. Also, a payment made by a customer is instantly confirmed when received by the biller.

A limitation of the "biller-direct" method is that the customers are required to visit each biller website individually to make the payment. In this process, some of the biller websites may require a customer to login with his/her login credentials. For such biller websites, the customer needs to remember the login credentials for each biller website. In addition, the customers also need to remember the Uniform Resource Locators (URLs) of each biller website. The customers then manually navigate to a payment webpage and subsequently enter the payment information on each and every biller website. Further, the customers have to manually keep a track of the payment made at each of the biller websites.

In light of the above discussions, there is a need for a method and a system for integrating the consolidator method offered by bill pay websites, such as bank websites, with the "biller-direct" method. In addition, there is a need for a method and a system that assists a customer while performing online payment related activities directly at the biller websites from a bill pay website.

SUMMARY

The present invention includes a method for performing an online payment related activity using a browser application. The browser application interfaces a bill pay website with one or more biller websites to which the online payment needs to be made. When a user logs-in to the bill pay website, the browser application gets activated. Thereafter, the user selects a biller from a list of billers pre-stored at the bill pay website. The browser application automatically navigates the user to the biller website of the selected biller, while concurrently maintaining a communication link to the bill pay website. The browser application then enters payment information on one or more payment related web pages displayed at the biller website. The online payment related activity is completed, and the user is navigated back to the bill pay website without a user input.

The present invention further describes a browser application that interfaces a bill pay website with one or more biller websites for performing an online payment related activity. The browser application communicates with a bill pay server of the bill pay website over a network. The browser application includes a user activity monitor configured to activate the browser application when a user logs-in to the bill pay website. The browser application also includes a navigation manager configured to automatically navigate the user to a biller website. Further, the navigation manager concurrently maintains a communication link to the bill pay website. The navigation to the biller website facilitates the display of one or more payment related web pages. Further, the browser application includes a web form filler configured to enter payment information in the one or more payment related web pages without a user input. The entering of the payment information facilitates the completion of the online payment related activity.

The present invention also describes a system for performing an online payment related activity by interfacing a bill pay website with one or more biller websites. A browser application is configured to interface the bill pay website with the one or more biller websites. Further, the browser application assists in performing the online payment related activity. A browser application server is configured to control the browser application and store information data-points corresponding to the biller websites. Further, a bill pay server is configured to store a plurality of user authentication information, payment information, a plurality of attributes associated with the online payment related activity, a copy of one or more payment related web pages, and a receipt of a completed online payment related activity.

The method and the system described above have numerous advantages. The present invention facilitates a user to initiate an online payment related activity at a biller website from within an online bill pay service of a bill pay website, such as bank websites, credit card issuer websites, card networks' websites, and websites of companies offering payment services. The present invention also facilitates the user to perform an online payment using a card issued by a bank or any other financial institution, which further allows instant acknowledgement of the online payment by the biller. The present invention also assists the user in conducting the online payment related activity by automatically populating the user authentication information and payment information at the biller website, and saving the receipt of a completed online payment. Also, the present invention consolidates the biller information and the payment information at a bill pay server of the bill pay website.

BRIEF DESCRIPTION OF THE DRAWINGS

The various embodiments of the invention will hereinafter be described in conjunction with the appended drawings, provided to illustrate, and not to limit, the invention, wherein like designations denote like elements, and in which.

DETAILED DESCRIPTION OF THE DRAWINGS

The present invention provides a browser application that facilitates performing online payment related activities at billers' websites from within a bill pay website. Additionally, the browser application assists a user while performing online payment related activities. The browser application is downloaded to the user's browser from a browser application server for the bill pay website. The browser application thereupon acts as an interface between the bill pay website and the biller websites to which online payments need to be made. It will be apparent to a person skilled in the art that the browser application may also be termed as browser add-in, browser plug-in, browser snap-in, browser accelerator, web slice, toolbar, browser helper object (BHO), and the like. Further, for clarity of the present invention, the browser application will hereinafter be referred to as a "Pay-Direct Assistant". Similarly, the browser application server will be referred to as a "Pay-Direct Assistant server".

Figure 1:
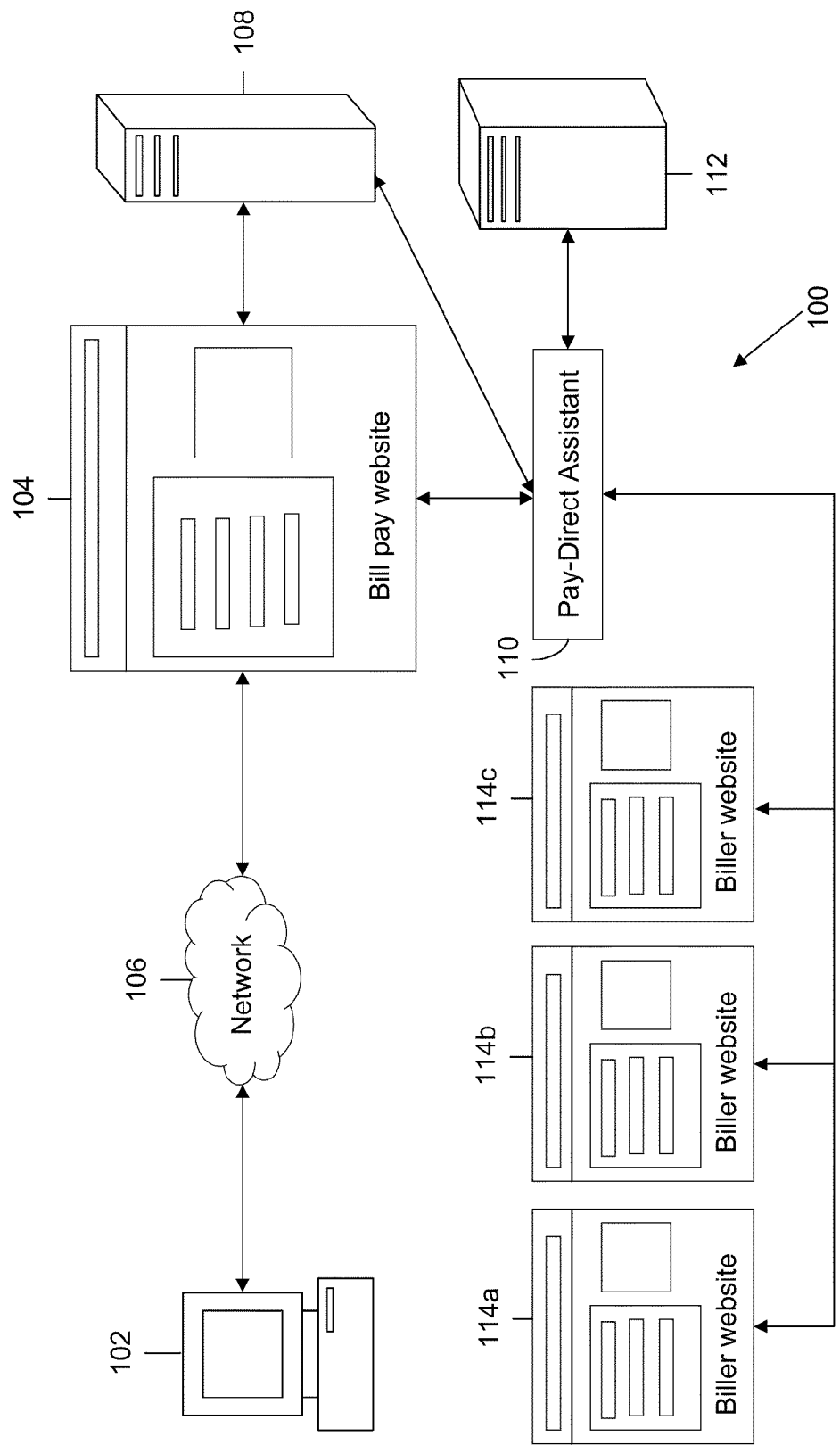
FIG. 1 illustrates an exemplary environment in which various embodiments of the invention may be practiced.

FIG. 1 illustrates an exemplary environment 100 in which various embodiments of the invention may be practiced. Environment 100 includes a client machine 102, a bill pay website 104, a network 106, a bill pay server 108, a Pay-Direct Assistant 110, a Pay-Direct Assistant server 112, and one or more biller websites, such as 114a, 114b, and 114c.

Client machine 102 interacts with bill pay website 104 via network 106. Further, client machine 102 employs a browser (not shown in FIG. 1) for connecting with bill pay website 104. Bill pay server 108 stores consolidated information related to users, billers, payments, and the like. Furthermore, bill pay website 104 communicates with bill pay server 108 via a communication link. Client machine 102 may also interact directly with bill pay server 108 and Pay-Direct Assistant server 112 via network 106. Further, bill pay server 108 and Pay-Direct Assistant server 112 may be combined into one server or their combined services may be split between the two servers in different ways.

A user (not shown in FIG. 1) at client machine 102 logs-in to bill pay website 104 and downloads Pay-Direct Assistant 110. This is a one-time action for client machine 102. For every subsequent log-in to bill pay website 104, Pay-Direct Assistant 110 is automatically activated on the browser of client machine 102. Further, the one-time action of downloading may be repeated when a newer version of Pay-Direct Assistant 110 is available for download, or when Pay-Direct Assistant 110 was previously uninstalled from client machine 102.

Pay-Direct Assistant 110 acts as an interface between the one or more biller websites, such as 114a, 114b, and 114c, and an online bill pay service of bill pay website 104. In other words, the user at client machine 102 interacts with biller websites 114a, 114b, and 114c while interfacing with bill pay website 104 and bill pay server 108. Further, Pay-Direct Assistant 110 communicates with Pay-Direct Assistant server 112 and bill pay server 108 via a communication link.

In an embodiment of the present invention, Pay-Direct Assistant 110 is activated for bill pay website 104. In this scenario, Pay-Direct Assistant 110 accesses information such as a list of billers, account information for billers, checking, debit card and credit card details from bill pay server 108 via the communication link. Further, Pay-Direct Assistant 110 integrates with the Graphical User Interface (GUI) of bill pay website 104. Pay-Direct Assistant 110 then assists the user while performing online payment related activities. In a preferred embodiment of the present invention, Pay-Direct Assistant 110 does not have any visible footprints on bill pay website 104, thereby operating as a background application.

In another embodiment of the present invention, Pay-Direct Assistant 110 is enabled at the one or more biller websites 114a-114c registered at bill pay website 104. In this scenario, Pay-Direct Assistant 110 is activated for the first time by the user from bill pay website 104. Subsequently, anytime the user directly visits the one or more biller websites 114a-114c outside of a session with bill pay website 104, Pay-Direct Assistant 110 automatically enables itself after requisite authentication with bill pay server 108 and assists the user while performing online payment related activities. In accordance with the embodiment of the present invention, Pay- Direct Assistant 110 fetches information including, but not limited to, checking, debit card and credit card details, and passwords, which is required to complete the online payment related activities from bill pay website 104. Further, Pay-Direct Assistant 110 relays information that includes, but is not limited to, receipts of a completed payment, and updated passwords, from the one or more biller websites 114a-114c to bill pay website 104 and bill pay server 108.

In a preferred embodiment of the present invention, bill pay website 104 is a bank website such as, by way of example only, Bank of America®, Citibank®, and Wells Fargo®, which offers online bill pay services. In another embodiment of the present invention, bill pay website 104 includes websites of companies offering payment services that include, but are not limited to, credit card companies, debit card companies, and pre-paid card companies. Bill pay website 104 can also be a hosted service deployed by bill pay consolidators who extend their service to include paying bills at the one or more biller websites. In yet another embodiment of the present invention, the invention may be utilized by e-commerce businesses, such as an online mall hosted by a loyalty program offered by a bank or a card issuer. Pay-Direct Assistant 110 assists the user to complete a shopping activity and collect savings offered by the loyalty program and/or a merchant on an online mall. Further, the one or more biller websites 114a-114c include, but are not limited to, service providers' websites, e-commerce websites, insurance websites, cable/satellite network websites, transportation websites, newspaper/magazines/books websites, health/fitness websites, and mailing/postage websites. In an embodiment of the present invention, the online payment related activity is conducting an online payment on the biller website, such as biller website 114a, from within the bank website, such as bill pay website 104. Further, it will be apparent to any person skilled in the art that the online payment also involves a series of tasks/activities that needs to be performed for conducting the online payment. These tasks/activities may be, but are not limited to, registering at a biller website, filling of the user authentication details, changing user authentication information for a biller website, updating online payment information, viewing a receipt of recent online payments, setting up an "auto-pay" option, signing-up for electronic delivery of bill statements, and changing card or Automated Clearing House (ACH) information used for recurring payment on the one or more biller websites. In various embodiments of the invention, these activities are assisted by Pay-Direct Assistant 110 while performing the online payment.

Examples of client machine 102 include, but are not limited to, a personal computer, a laptop, a personal digital assistant (PDA), a smart phone, or a mobile computing device. Various examples of the browser through which client machines 102 interacts with bill pay website 104 include, but are not limited to, Microsoft Internet Explorer, Mozilla Firefox, Apple Safari, Google Chrome, and Opera. In addition, the various examples of network 106 through which client machine 102 interacts with bill pay website 104 can be the Internet, a Local Area Network (LAN), a Wide Area Network (WAN), a Wireless LAN, a Metropolitan Area Network (MAN), a Global System for Mobile (GSM) communication network, and a Code Division Multiple Access (CDMA) network. Further, the communication link between bill pay website 104 and bill pay server 108, Pay-Direct Assistant 110 and Pay-Direct Assistant server 112, and Pay-Direct Assistant 110 and bill pay server 108, respectively, may be wired, wireless, or a combination of both.

Figure 2:
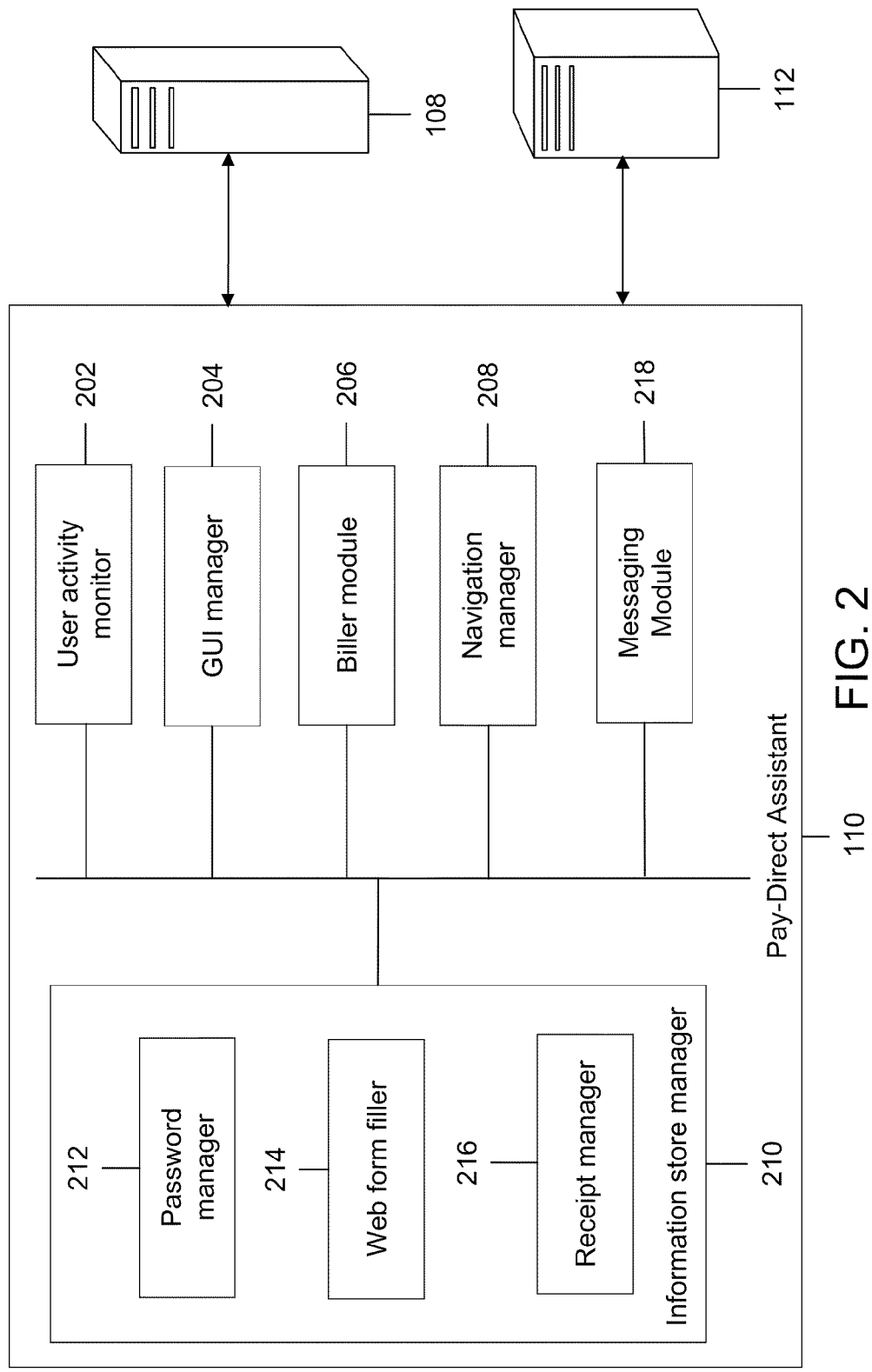
FIG. 2 is a block diagram of a Pay-Direct Assistant that facilitates an online payment related activity to be made at one or more biller websites from within a bill pay website, in accordance with an embodiment of the invention.
Figure 3A:
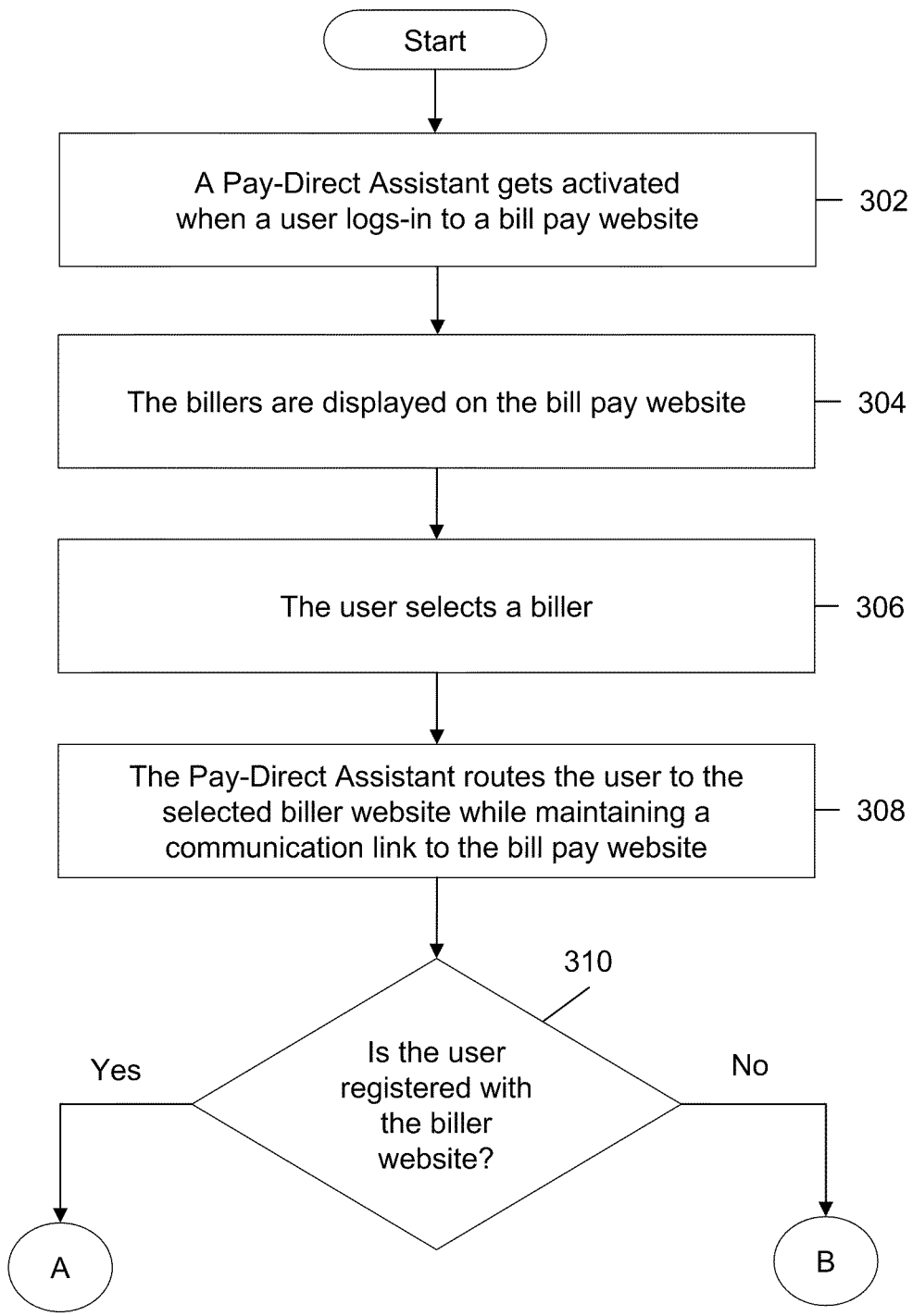
FIGS. 3A, 3B, 3C, and 3D illustrate a flowchart of a method for facilitating an online payment related activity to be made at one or more biller websites from within a bill pay website, in accordance with an embodiment of the invention.
Figure 3B:
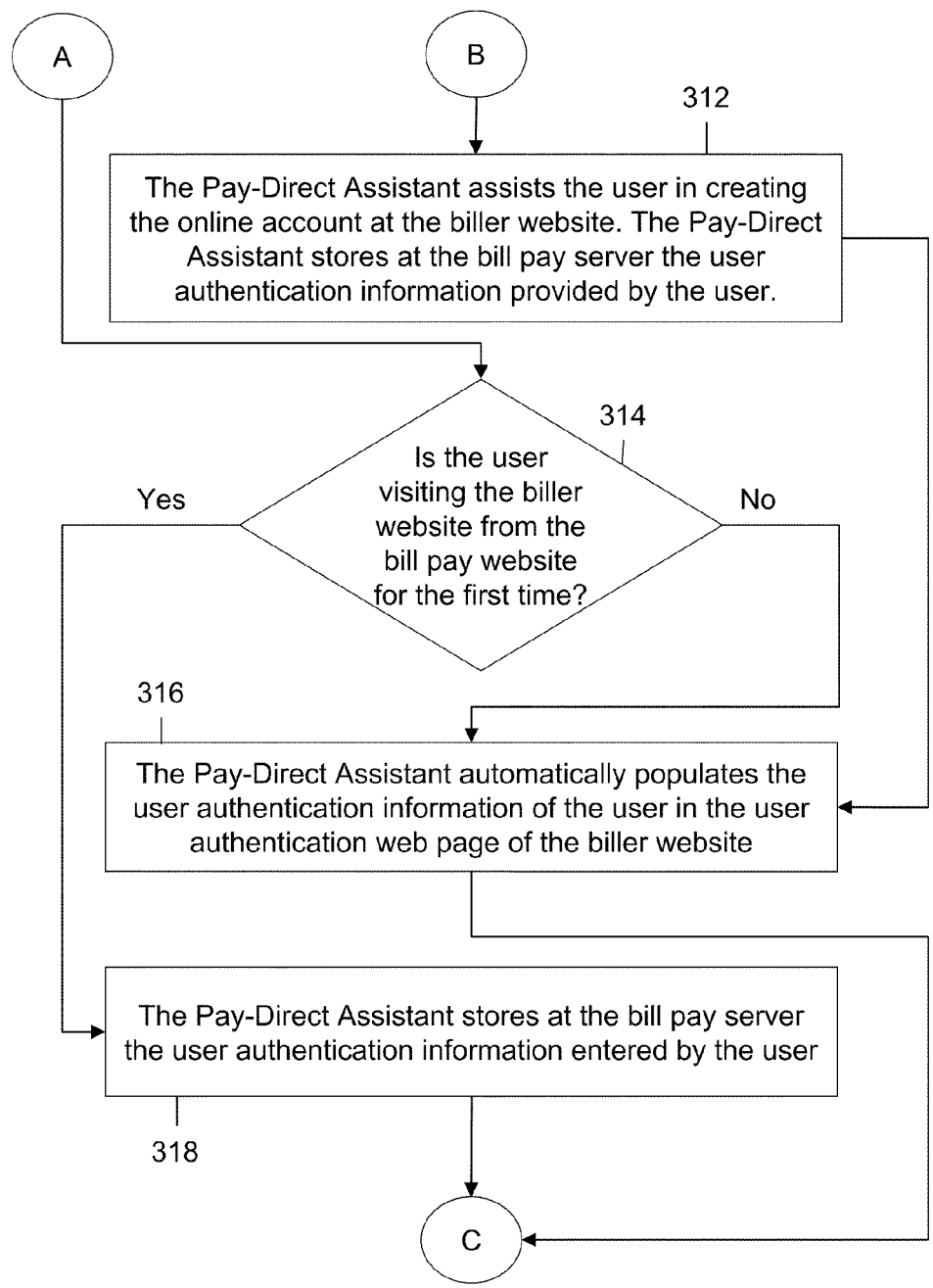
Figure 3C:
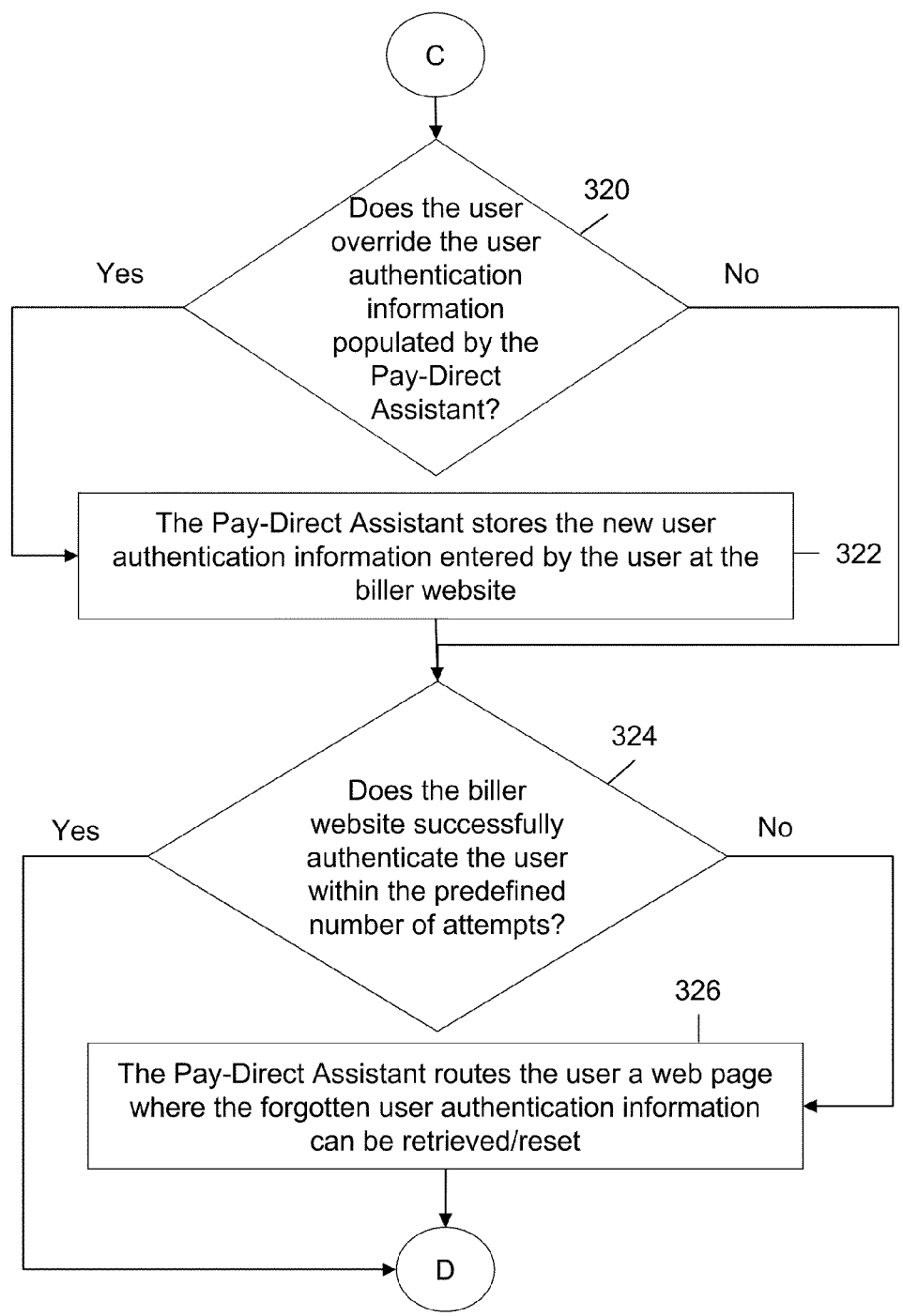
Figure 3D:
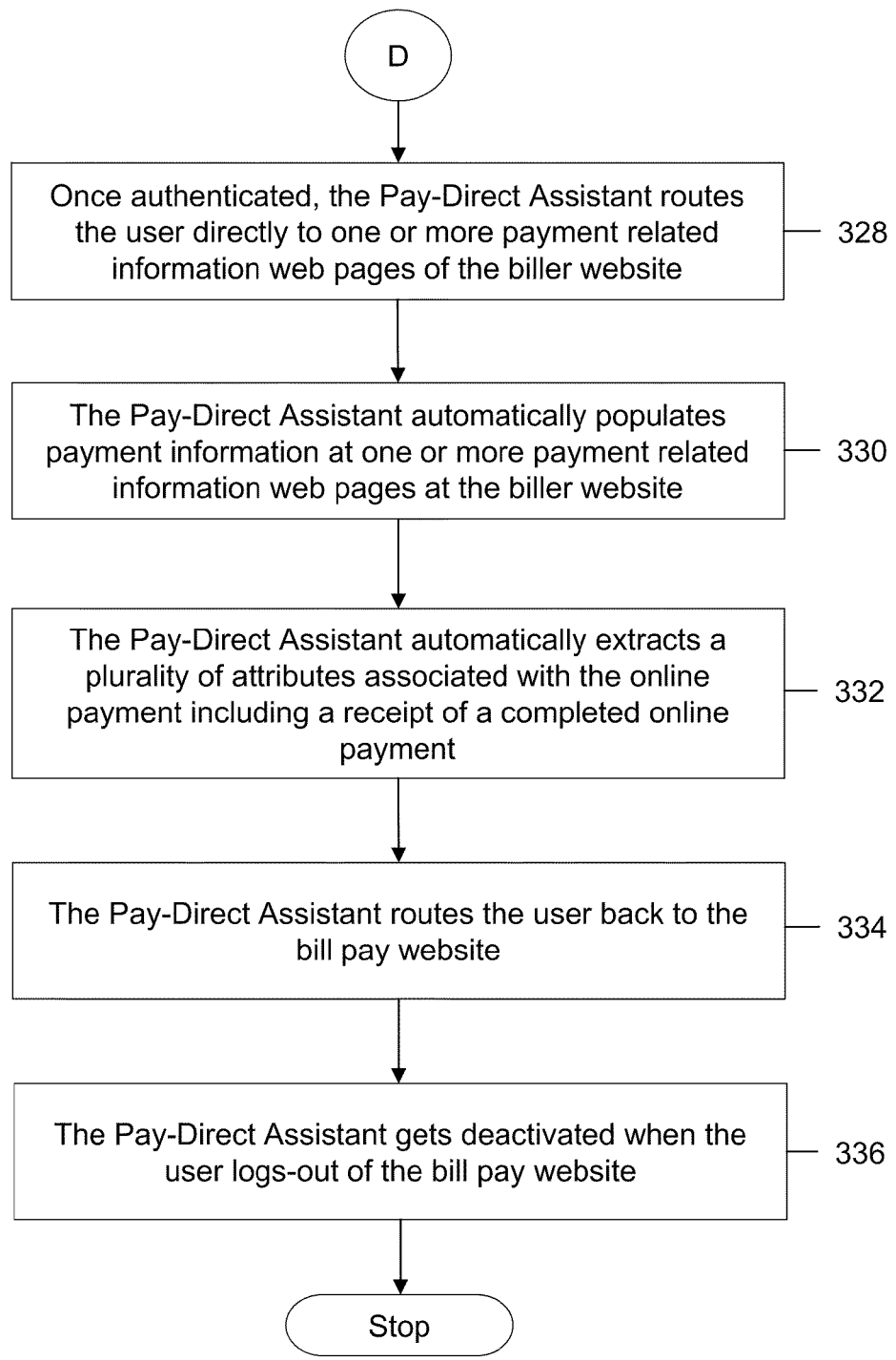

FIG. 2 is a block diagram of Pay-Direct Assistant 110 that facilitates an online payment related activity to be made at the one or more biller websites from within bill pay website 104, in accordance with an embodiment of the invention. Pay-Direct Assistant 110 includes a user activity monitor 202, a Graphical User Interface (GUI) manager 204, a biller module 206, a navigation manager 208, an information store manager 210, and a messaging module 218. Further, information store manager 210 includes a password manager 212, a web form filler 214, and a receipt manager 216.

User activity monitor 202 registers various event handlers related to the user's activity at bill pay website 104 and the one or more biller websites, such as biller website 114a. In an embodiment of the present invention, the events related to the user's activity include, but are not limited to, user interface events that are generated by user interaction through an external device (such as mouse, and keyboard), and user interface logical events (such as focus change messages or element triggering notifications). For instance, when the user logs-in to bill pay website 104 by entering user authentication information via an external device (such as mouse, and keyboard), user activity monitor 202 registers a log-in event relating to bill pay website 104. Similarly, when the user navigates to a payment related web page on biller website 114a, user activity monitor 202 registers a fill-form event relating to biller website 114a. User activity monitor 202 also monitors the web page loading at bill pay website 104 and the one or more biller websites, such that changes to the web interface as triggered by the user or automatically triggered by the web page is monitored by user activity monitor 202. In an embodiment of the present invention, user activity monitor 202 registers various user activities based on the context of the browser. Thus for example, at the time of log-in, the browser may display a Uniform Resource Locator (URL), such as "www.comcast.login.php", in its address bar. Thereafter, user activity monitor 202, based on the context, i.e., keyword "login" mentioned in the URL, infers that the user is currently on the log-in page of the biller Comcast.

Based on the user's activity, user activity monitor 202 activates a combination of GUI manager 204, biller module 206, navigation manager 208, information store manager 210, or messaging module 218.

GUI manager 204 is utilized to ascertain the different GUIs of the one or more biller websites and bill pay website 104. In a preferred embodiment of the present invention, Pay-Direct Assistant 110 may be downloaded by the user to pay at more than one bill pay website, such that for each bill pay website a different GUI is enabled. Similarly, the one or more biller websites with which Pay-Direct Assistant 110 interacts may also have varied GUIs. Based on the events and context determined by user activity monitor 202, GUI manager 204 dynamically determines the appropriate GUI rendering to be injected on the web pages of each biller website and each bill pay website. Further, the GUI injected on the web pages can have different layout, position or text based on the events, and context determined by user activity monitor 202. In various embodiments of the present invention, the GUI rendering related characteristics associated with each of the biller websites and bill pay websites are stored at Pay-Direct Assistant server 112.

GUI manager 204 also stores an emblem associated with bill pay website 104 at Pay-Direct Assistant server 112. Thereafter, GUI manager 204 displays the emblem of bill pay website 104 on the web pages of the one or more biller websites. The presence of the emblem ensures that the user is aware of the identity of bill pay website 104 on the one or more biller websites. It will be apparent to a person skilled in the art that the emblem may be a logo, a symbol, a trademark, a slogan, and so forth associated with bill pay website 104.

In an embodiment of the present invention, GUI manager 204 stores a profile for each user on Pay-Direct Assistant server 112. The profile includes information corresponding to personalization performed by each user on bill pay website 104 and the one or more biller websites. The personalization information includes, but is not limited to, preferred language, preferred location, personalized recommendations, recent history, and favorite links. Based on the events and context determined by user activity monitor 202, GUI manager 204 fetches the profile for a user from Pay-Direct Assistant server 112. The personalization information is examined and a corresponding GUI is instilled on bill pay website 104 and the one or more biller websites. Further, GUI manager 204 refreshes the profile for each user stored on Pay-Direct Assistant server 112 after each session performed on bill pay website 104 and the one or more biller websites. In another embodiment of the present invention, the profile for each user is updated at regular intervals of time.

Bill pay website 104 includes a list of billers that accept payments from the user via various modes. A user modifies the list of billers by adding or deleting billers. Further, the service offered by Pay-Direct Assistant 110 is also enabled for a predetermined list of billers. Therefore, when Pay-Direct Assistant 110 is downloaded for bill pay website 104, the existing billers of bill pay website 104 are mapped onto the billers enabled for Pay-Direct Assistant 110. Thereafter, the service offered by Pay-Direct Assistant 110 is enabled for the billers common to both bill pay website 104 and Pay-Direct Assistant 110.

Once Pay-Direct Assistant 110 is enabled at bill pay website 104, biller module 206 of Pay-Direct Assistant 110 fetches and stores information data-points corresponding to each of these enabled billers. The information data-points include, but are not limited to, the type of payments accepted by the enabled biller websites, such as ACH, credit card, prepaid cards, and debit cards, the types of bills that can be paid at the enabled biller websites, whether the enabled biller websites require a login to complete a payment, whether there is a convenience fee associated with making a payment, and whether "auto-pay" option is available at the enabled biller websites. In a preferred embodiment of the present invention, bill pay server 108 stores the information data-points corresponding to each of the enabled billers in a biller directory (not shown in FIG. 2). When the user logs-in at a bill pay website, such as bill pay website 104, biller module 206 dynamically fetches the information data-points related to the enabled billers from the biller directory of bill pay server 108. In accordance with the embodiment of the present invention, while the user is navigating on bill pay website 104, user activity monitor 202 determines whether the user adds or deletes billers on bill pay website 104 in real time. Subsequently, user activity monitor 202 triggers biller module 206 which dynamically relays information corresponding to the added or deleted billers to the biller directory of bill pay server 108.

Navigation manager 208 records the Uniform Resource Locators (URLs) to websites of the billers that were dynamically fetched by biller module 206. The web pages for which URLs are recorded include, but are not limited to, a user authentication page, a credit card payment web page, an ACH payment web page, a debit card information web page, a prepaid card information web page, an automatic bill payment setup web page, and an enable electronic billing web page. In a preferred embodiment of the present invention, when the user selects a biller on bill pay website 104, navigation manager 208 determines whether the biller website of the selected biller, such as biller website 114a, requires performing user authentication prior to conducting an online payment. If biller website 114a contains a user authentication web page, navigation manager 208 fetches the URL of the user authentication web page of biller website 114a from Pay-Direct Assistant server 112. It will be apparent to any person skilled in the art that the user authentication page is a web page where the user provides user authentication information prior to accessing biller website 114a. Once the user is authorized by biller website 114a, navigation manager 208 automatically navigates the user to one or more payment related web pages on biller website 114a where payment can be initiated. Further, if biller website 114a does not include the user authentication web page, navigation manager 208 directly routes the user to the one or more payment related web pages. In either case, navigation manager 208 may also navigate the user to other appropriate web pages on biller website 114a which include, but are not limited to, a view payment history web page, a web page for signing-up for automatic payment, a web page where paper statements can be turned-off, a web page where payment information stored at biller website 114a can be changed, a web page enabling registration on biller website 114a, and a web page where passwords can be changed. Therefore, the user is not required to manually enter the URLs of the appropriate web pages on the biller website.

The navigation to the one or more payment related web pages or to the other appropriate web pages on biller website 114a is accomplished by a web crawler employed by navigation manager 208. The web crawler dynamically monitors user's navigation. Further, the web crawler determines that online payment related activities need to be performed by analyzing the Document Object Model of the web pages on each of the one or more biller websites based on heuristics rules. For example, a heuristic rule may correspond to a preference set by a user that after being authenticated at the user authentication web page, he/she should be directly routed to the one or more payment related web pages. In another example, the heuristics rules may be pre-defined by a system administrator.

In an embodiment of the present invention, the web crawler may also utilize biller context based on the information fetched by biller module 206, such as "auto-pay" option, to ascertain that online payment related activities need to be performed. Thereafter, the web crawler fetches the URLs of the one or more payment related web pages from the one or more biller websites 114a-114c, or from bill pay server 108.

In another embodiment of the present invention, the user may manually navigate the one or more biller websites to access the one or more payment related web pages. In a preferred embodiment of the present invention, navigation manager 208 stores the URL of bill pay website 104 at Pay-Direct Assistant server 112. Therefore, navigation manager 208 concurrently maintains a communication link to bill pay website 104, such that the user can be navigated back automatically without a user input to bill pay website 104 after completing online payment at the one or more biller websites. The communication link is also used for relaying data, such as passwords, and payment information between bill pay website 104 and Pay-Direct Assistant 110 when the user is at the one or more biller websites 114a-114c.

In a preferred embodiment of the present invention, navigation manager 208 monitors the changes to the layout on each biller website such that any change in the corresponding URLs is recorded. Navigation manager 208 revisits the URLs of each biller website at regular intervals. If any URL is found to be broken or the domain of a biller website has changed, navigation manager 208 upgrades the corresponding URLs in Pay-Direct Assistant server 112. In an embodiment of the present invention, the web crawler navigates the one or more biller websites and checks all the URLs. Also, the interval of revisiting the URLs can be uniform, i.e., all URLs can be revisited with the same frequency, or it can be proportional, i.e., the URLs that change more frequently are revisited more often. In another embodiment of the present invention, for the web pages that are not readily accessible to the web crawler, the URLs may be checked manually by a system administrator of Pay-Direct Assistant server 112 at regular intervals.

When user activity monitor 202 detects that the user is currently at a user authentication web page of a biller website, such as biller website 114*a*, password manager 212 automatically fills in user authentication information without a user input. In a preferred embodiment of the present invention, the user needs to enter the user authentication information when biller website 114*a* is accessed for the first time. Password manager 212 extracts the user authentication information and relays the user authentication information for storing it to bill pay server 108. In all subsequent visits to biller website 114*a*, password manager 212 extracts the user authentication information from bill pay server 108 and populates it in the user authentication web page of biller website 114*a*. In another embodiment of the present invention, the user may override the user authentication information populated by password manager 212 and enter new user authentication information. Subsequently, password manager 212 extracts the new user authentication information and relays the new user authentication information for storage to bill pay server 108. Password manager 212 automatically populates the new user authentication information in the user authentication web page in every subsequent visit to biller website 114*a*. In an embodiment of the present invention, the new user authentication information is stored prior to authenticating the user at biller website 114*a*. In another embodiment of the present invention, password manager 212 stores the new user authentication information only when the user is successfully authenticated by biller website 114*a* based on the new user authentication information.

Further, when user activity monitor 202 detects that the user is currently at the one or more payment related web pages of biller website 114*a*, web form filler 214 automatically fills in payment information in the various fields provided on the one or more payment related web pages without the need for a user input. In a preferred embodiment of the present invention, web form filler 214 gathers the payment information from bill pay server 108. In an embodiment of the present invention, the payment information corresponds to credit card information which includes, but is not limited to, the user's name on a credit card, digits on the credit card, the expiration date of the credit card, the amount due, a Card Verification Value (CVV) code, billing address, or any other information of the user. In another embodiment of the present invention, the payment information corresponds to ACH information which includes, but is not limited to, the bank account number, the bank account type, the routing number, the customer reference number, the amount due, or any other information of the user. In yet another embodiment of the present invention, the payment information may also correspond to other electronic modes of payment such as, debit cards, prepaid cards, and alternate payment methods. Further, one or more payment information, such as the CVV code, may be manually entered by the user. In such a scenario, messaging module 218 displays a message to the user prompting him/her to fill-in the required payment information.

Web form filler 214 parses the Document Object Model of biller website 114*a* and identifies the fields on the one or more payment related web pages. These fields are then mapped onto the payment information gathered from bill pay server 108. In an embodiment of the present invention, the mapping is based on the heuristics associated with the context and the layout of the one or more payment related web pages, which are determined by a combination of user activity monitor 202, GUI manager 204, and navigation manager 208. In another embodiment of the present invention, the mapping is predefined for the one or more payment related web pages of biller website 114*a*.

In yet another embodiment of the present invention, the fields of the one or more payment related web pages may be locked after the web form fill action, whereby the user is prevented from modifying a mode of payment, such as credit card, ACH, and debit card, for the online payment. This ensures that the payment is done with a chosen payment mode of bill pay website 104.

While the user is navigating the one or more payment related web pages, receipt manager 216 dynamically extracts a plurality of attributes associated with the online payment. The plurality of attributes include, but are not limited to, date paid, digits of a payment card number, a card type, a payment reference issued by the biller, or any other information of the user. In another embodiment of the present invention, the plurality of attributes may include, but are not limited to, amount paid, date paid, the scheduled future date for payment, a bank account number, a bank account type, a routing number, a payment reference number, or any other information of the user. In a preferred embodiment of the present invention, receipt manager 216 captures a copy of the one or more payment related web pages. In another embodiment of the present invention, receipt manager 216 may also capture a copy of the web pages confirming setting up automatic monthly payments, and a view payment history web page.

Receipt manager 216 captures, without a user input, a receipt of the web page confirming a completed online payment on biller website 114*a*. It will be apparent to any person skilled in the art that the copy of the web page confirming the completed online payment or the one or more payment related web pages is a replica of the web pages and can be stored in a predefined format such as, but not limited to, JPEG, JPG, TIFF, PNG, BMP, PDF, MHTML, HTML, text, and MS-Word document.

In a preferred embodiment of the present invention, receipt manager 216 stores the extracted attributes, the copy of the web page confirming the completed online payment, and the copy of the one or more payment related web pages on bill pay server 108. Further, receipt manager 216 fetches the extracted attributes, the copy of the web page confirming the completed online payment, and the copy of the one or more payment related web pages from bill pay server 108 whenever the user wants to access these from within bill pay website 104. In another embodiment of the present invention, receipt manager 216 encrypts and compresses the extracted attributes, the copy of the web page confirming the completed online payment, and the copy of the one or more payment related web pages before storing these on bill pay server 108. Thus, it will be apparent to any person skilled in the art that, receipt manager 216 decrypts and decompresses the extracted attributes, the copy of the web page confirming the completed online payment, and the copy of the one or more payment related web pages while fetching these from bill pay server 108.

Messaging module 218 displays one or more promotional messages and informational messages from bill pay website 104 or the one or more biller websites 114a-114c to the user. The promotional messages include, but are not limited to, information such as "balance amount on a debit card", "reward points", and "cash backs". In an embodiment of the present invention, the promotional messages are displayed based on biller context as determined by biller module 206, such as whether a biller allows "auto-pay" option. In another embodiment of the present invention, the promotional messages are displayed based on navigation context as determined by navigation manager 208. The promotional messages may be hyperlinked such that the user can select a promotional message and is routed to another web page displaying related information vis-à-vis the promotional message. Further, the promotional messages are displayed on the same GUI window of bill pay website 104 and the one or more biller websites. In another embodiment of the present invention, the promotional messages are displayed on different GUI window of bill pay website 104 and the one or more biller websites.

The informational messages displayed by messaging module 218 instruct and assist the user while performing the online payment. The informational messages include, but are not limited to, instructing the user to fill an amount to be paid, instructing the user to click on a "log-out" option to log-out from a biller website, and displaying personal information associated with the user. Messaging module 218 stores a predetermined list of these informational messages. The informational messages are selected based on the context determined by user activity monitor 202. First, user activity monitor 202 determines the appropriate web pages that are displayed on the browser, such as login/registration web page, a web page for making an online payment, and a web page for confirming the online payment. Then, based on the displayed web pages, messaging module 218 selects one or more informational messages from the predetermined list of informational messages and displays them to the user. Therefore, the informational messages displayed to user are relevant and context sensitive. For instance, when a login web page is displayed on the browser, messaging module 218 displays messages such as "Please enter your login credentials. Your login credentials will be automatically saved for the future use", and "Your login credentials have been populated. Press Sign-In to continue". Similarly, when the web page for confirming the online payment is displayed, messages such as "Please confirm the details", and "Please verify the information on the page before you continue" are displayed to the user.

Pay-Direct Assistant server 112 acts as a controller for Pay-Direct Assistant 110. Pay-Direct Assistant server 112 stores multiple versions of Pay-Direct Assistant 110. When user activity monitor 202 registers a log-in event of the user on bill pay website 104, Pay-Direct Assistant server 112 analyzes factors such as, but not limited to, the browser employed by the user's client machine, and the operating system of the user's client machine. In a preferred embodiment of the present invention, user activity monitor 202 analyzes the Document Object Model of the web pages of bill pay website 104 and determines the operating system, browser, version of the browser, and the like employed by the user's client machine. Based on these factors, Pay-Direct Assistant server 112 enables the appropriate version of Pay-Direct Assistant 110. Further, Pay-Direct Assistant server 112 includes rules to drive and upgrade Pay-Direct Assistant 110 at regular intervals, as necessary. In a preferred embodiment of the present invention, the upgrading of Pay-Direct Assistant 110 includes, but is not limited to, browser upgrades, operating system changes, incorporating new technologies employed by browsers, fixing software bugs, adding new functionality or improving existing functionality, and improving performance. Furthermore, as discussed above, Pay-Direct Assistant server 112 stores the URLs for the websites of the billers that are dynamically fetched by biller module 206 from bill pay server 108. Pay-Direct Assistant server 112 also stores the URLs of the bill pay websites with which Pay-Direct Assistant 110 integrates. The information data-points fetched by biller module 206 corresponding to each of the one or more biller websites may also be stored by Pay-Direct Assistant server 112.

FIGS. 3A, 3B, 3C, and 3D illustrate a flowchart of a method for facilitating an online payment related activity to be made at the one or more biller websites from within bill pay website 104, in accordance with an embodiment of the invention. FIG. 3 will now be described in conjunction with FIG. 2.

At step 302, a user logs-in to a bill pay website, such as bill pay website 104. Once the user is authenticated, the bill pay website determines whether a Pay-Direct Assistant, such as Pay-Direct Assistant 110, is already installed on the user' client machine. If the Pay-Direct Assistant has not been installed, firstly the user needs to download the Pay-Direct Assistant to activate it. If however, the Pay-Direct Assistant has already been installed, the bill pay website activates the Pay-Direct Assistant. In a preferred embodiment of the present invention, the Pay-Direct Assistant is available in multiple versions depending on factors such as, but not limited to, operating system of the user's client machine, and browser employed by the user's client machine. The bill pay website evaluates these factors and subsequently activates the appropriate version of the Pay-Direct Assistant on the user's client machine. In another embodiment of the present invention, these factors may be evaluated by a Pay-Direct Assistant server, such as Pay-Direct Assistant server 112. Further, a user activity monitor, such as user activity monitor 202, of the Pay-Direct Assistant registers the user's log-in event.

At step 304, a list of billers which was pre-stored on the bill pay website is displayed to the user. In a preferred embodiment of the present invention, the list of billers also showcases the details regarding the billers. The details may include, but are not limited to, the type of payments accepted by the biller websites, such as ACH, credit card, prepaid cards, and debit cards, the types of bills that can be paid at the biller websites, whether the biller websites require a login to complete a payment, whether there is a convenience fee associated with making a payment, and whether an "auto-pay" option is available at the one or more biller websites. In a preferred embodiment of the present invention, a bill pay server, such as bill pay server 108, stores the information related to the billers in a biller directory. When the user logs-in to the bill pay website, a biller module, such as biller module 206, dynamically fetches the information relating to various billers registered by the user for the bill pay website from the biller directory of the bill pay server. In an embodiment of the present invention, the details may be displayed as graphical icons on the bill pay website. In another embodiment of the present invention, the details may be displayed as text on the bill pay website.

At step 306, the user activity monitor registers an event of user selecting a biller from the list of billers to which an online payment is to be made. At step 308, a navigation manager, such as navigation manager 208, fetches the URL of a user authentication web page of a biller website of the selected biller, from the Pay-Direct Assistant server. The user is then routed directly to the biller website and the user authentication web page is displayed. Further, the navigation manager concurrently maintains a communication link to the bill pay website. In an embodiment of the present invention, if the navigation manager determines that the biller website does not include a user authentication web page, the navigation manager routes the user to one or more payment related web pages on the biller website.

At step 310, a password manager, such as password manager 212, determines whether the user is registered with the biller website. If the user is not registered with the biller website, step 312 is performed, else step 314 is performed. At step 312, the navigation manager automatically routes the user to a web page where registration can be initiated. Thereafter, the password manager assists the user in creating a new account at the biller website. The password manager can populate information such as, but not limited to, user's name, address, and an account number, while the account is being created. Further, the password manager stores the user authentication information entered by the user at the bill pay server. After the account is created, step 316 is performed and the user is routed back to the user authentication web page. The password manager automatically populates the user authentication information at the user authentication web page without a user input.

At step 314, the password manager determines whether the user is visiting the biller website from the bill pay website for the first time. If the user is visiting the biller website for the first time, step 318 is performed where the user manually enters user authentication information in the user authentication web page. The password manager relays the user authentication information for storage to the bill pay server. In an embodiment of the present invention, the user authentication information includes a username and a password. In another embodiment of the present invention, the user authentication information may include an e-mail address field, a security code field, and account identification information such as account number or an address with zip code. Further, if the user has visited the biller website earlier, step 316 is performed after step 314. The password manager extracts the user authentication information from the bill pay server and automatically populates the user authentication information at the user authentication web page without a user input.

At step 320, the user activity monitor determines whether the user is overriding the user authentication information automatically populated by the password manager. The user overrides the user authentication information when he/she may have changed the user authentication information at the biller website outside a session with the bill pay website. Therefore, if the user has entered new user authentication information, step 322 is performed. The new user authentication information is relayed by the password manager for storage to the bill pay server. Thereafter, in all subsequent visits to the biller website, the password manager populates the new user authentication information on the user authentication web page. In another embodiment of the present invention, the password manager stores the new user authentication information only after the new user authentication information is authenticated by the biller website.

At step 324, the biller website authenticates the user based on the user authentication information. In an embodiment of the present invention, the user activity monitor determines whether the authentication fails while the user attempts to enter the new authentication information for a predefined number of attempts. If the predefined number of unsuccessful attempts is reached, step 326 is performed. At step 326, the navigation manager navigates the user to a web page where the forgotten user authentication information can be retrieved or to a web page where the forgotten user authentication information can be reset. It will be apparent to a person skilled in the art that the web page where the forgotten user authentication information is retrieved instructs the user to provide input against predetermined fields, such as a secret question, birthday, or other question. In an embodiment of the present invention, the predetermined fields are entered by the user while registering with the biller website.

If the user is successfully authenticated by the biller website, step 328 is performed where the user is allowed to access the web pages within the biller website.

At step 328, the navigation manager automatically routes the user directly to the one or more payment related web pages on the biller website where the online payment can be initiated. This is accomplished by the web crawler employed by the navigation manager. The web crawler dynamically monitors user's navigation. When the web crawler determines that the online payment needs to be performed, it fetches the URLs of the one or more payment related web pages from the Pay-Direct Assistant server, and redirects the user to the appropriate web page on the biller website. In a preferred embodiment of the present invention, the appropriate web page to which the user is redirected is determined by the bill pay website based on user preferred activities. The user preferred activities include, but are not limited to, viewing the history of auto-payments, and setting alerts on the biller website. Thus, based on the user preferred activities, the navigation manager may redirect the user to an instant payment web page for ACH, a web page for setting up auto-pay, a web page for signing-up electronic delivery of bill statements, a web page for changing recurring payment instructions, or a web page for changing card information used for recurring payment on the biller website (when a new card is issued to replace a lost/stolen card). In another embodiment of the present invention, the user may manually navigate the biller website to access the one or more payment information web pages.

At step 330, the user activity monitor determines that the one or more payment related web pages are displayed at the biller website. A web form filler, such as web form filler 214, fetches payment information from the bill pay server and automatically populates the payment information on the one or more payment related web pages without a user input. In an embodiment of the present invention, the payment information corresponds to payment card information which includes, but is not limited to, user's name on a credit card, digits on the credit card, the expiration date of the credit card, amount due, the CVV code, billing address, or any other information of the user. In another embodiment of the present invention, the payment information corresponds to ACH information and includes, but is not limited to, the bank account number, bank account type, routing number, customer reference number, amount due, or any other information of the user. In yet another embodiment of the present invention, the payment information may also correspond to other electronic modes of payment such as, debit cards, prepaid cards, and alternate payment methods. Further, one or more payment information, such as the CVV code may be manually entered by the user. In such a scenario, a messaging module, such as messaging module 218, displays a message to the user prompting him/her to fill-in the required payment information.

At step 332, while the user navigates the one or more payment related web pages, a receipt manager, such as receipt manager 216, dynamically extracts a plurality of attributes associated with the online payment. The plurality of attributes include, but are not limited to, amount paid, date paid, digits of a payment card number, a card type, a payment reference issued by the biller, or any other information of the user. In another embodiment of the present invention, the plurality of attributes may include, but are not limited to, amount paid, date paid, the scheduled future date of payment, a bank account number, a bank account type, a routing number, a payment reference number, or any other information of the user.

In a preferred embodiment of the present invention, the receipt manager captures a copy of the one or more payment related web pages and a receipt of a completed online payment. The receipt manager stores the extracted attributes, the receipt of the completed online payment, and the copy of the one or more payment related web pages on the bill pay server.

At step 334, once the online payment is authorized by the user, the receipt of payment is instantly confirmed by the biller website and the online payment is complete. The navigation manager then routes the user back to the bill pay website.

Finally, at step 336, a GUI manager, such as GUI manager 204, provides an easy interface to the user to log-out from the bill pay website. The user activity monitor detects a log-out event when the user logs-out from the bill pay website. Consequently, the Pay-Direct Assistant is de-activated. The next time the user logs-in to the bill pay website, the user active monitor detects the log-in event and the Pay-Direct Assistant is activated once again.

Figure 4:
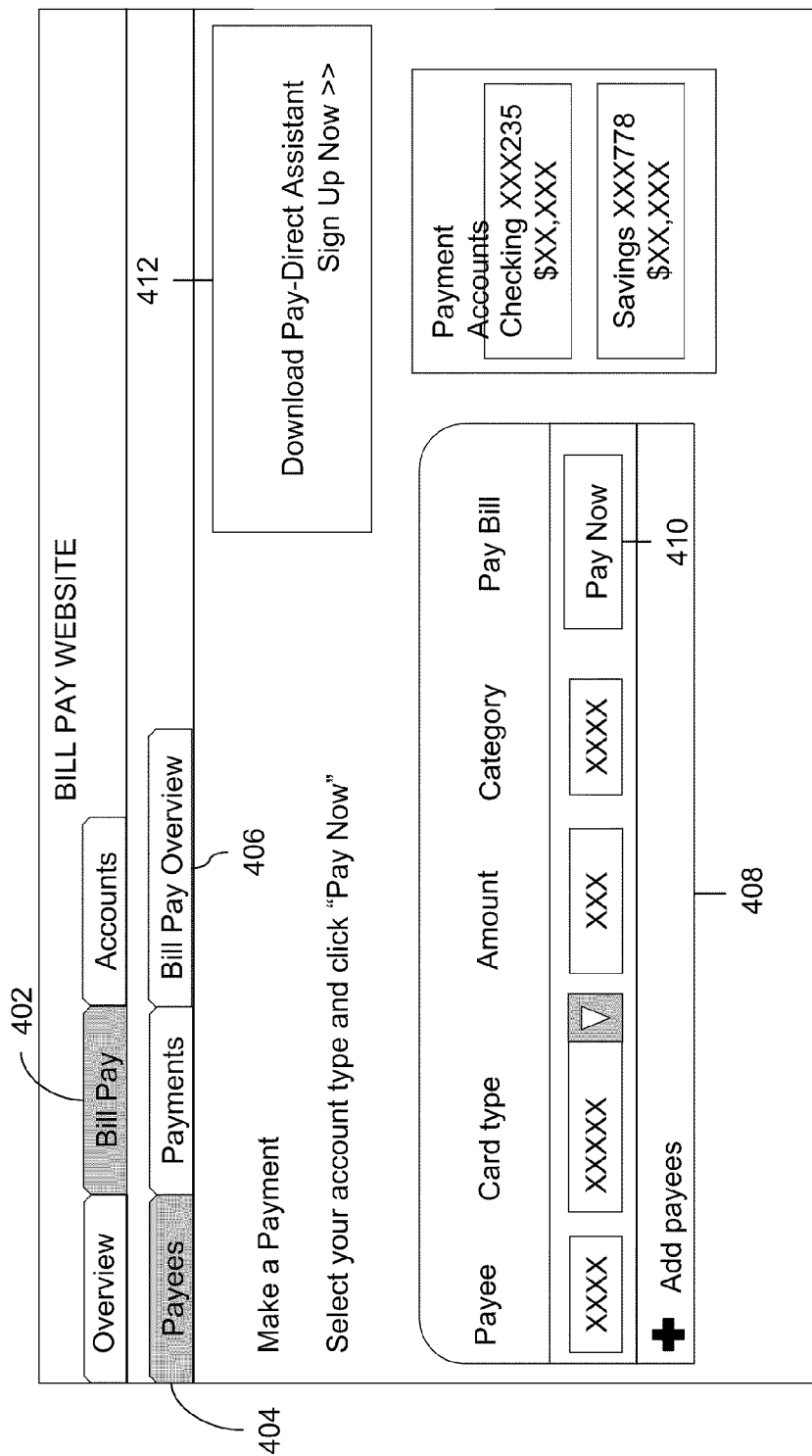
FIG. 4 illustrates an exemplary user interface of a bill pay website illustrating initiation of an online payment to a biller website, in accordance with an embodiment of the invention.

FIG. 4 illustrates an exemplary user interface of bill pay website 104 illustrating initiation of an online payment to biller website 114a, in accordance with an embodiment of the invention. When a user logs-in to bill pay website 104, bill pay website 104 may display a Pay-Direct Assistant download message to the user in a messaging panel 412. If the user wants to enroll in the service, he/she downloads Pay-Direct Assistant 110. This is a one-time action for the user's client machine. For every subsequent log-in to bill pay website 104, Pay-Direct Assistant 110 is automatically activated. In another embodiment of the present invention, if a newer version of Pay-Direct Assistant 110 is available for download, a corresponding message is displayed to the user in messaging panel 412. Subsequently, the user may download the newer version, thereby replacing the existing version of Pay-Direct Assistant 110 downloaded on the client machine. In yet another embodiment of the present invention, the user may have previously uninstalled Pay-Direct Assistant 110 from the client machine. In such a scenario, bill pay website 104 again displays the Pay-Direct Assistant download message to the user in messaging panel 412. In a preferred embodiment of the present invention, Pay-Direct Assistant 110 does not have any visible footprints on bill pay website 104, thereby operating as a background application.

Further, other alternate messages are dynamically displayed in messaging panel 412 once Pay-Direct Assistant 110 is activated for bill pay website 104. The alternate messages include, but are not limited to, one or more promotional and informational messages from bill pay website 104. The details of the promotional and informational messages have been discussed in the explanation of FIG. 2.

The user traverses bill pay website 104 and selects a "Bill Pay" tab 402 for accessing the online bill pay service. On further selecting a "Payees" tab 404, a biller information section 408 is displayed. Biller information section 408 includes a list of payees/billers and their details. The details may include, but are not limited to, the type of card payments accepted by the biller websites, such as ACH, credit card, prepaid cards, and debit cards, the types of bills that can be paid at the biller websites, whether the biller websites require a login to complete a payment, whether there is a convenience fee associated with making a payment, and whether "auto-pay" option is available at the one or more biller websites. The details are fetched from bill pay server 108 by Pay-Direct Assistant 110. In an embodiment of the present invention, the details may be displayed as graphical icons on biller information section 408. In another embodiment of the present invention, the details may be displayed as text on biller information section 408. Biller information section 408 may also display other information that includes, but is not limited to, an amount to be paid, category, and last paid date.

The user can either select an already displayed biller from biller information section 408 or can add a new biller. In an embodiment of the present invention, biller information section 408 may allow the user to add or delete billers. The user selects a biller to whom a payment is to be made by clicking on a "Pay Now" button 410. In another embodiment of the present invention, "Pay Now" button 410 may be replaced by a "Pay With Card" button, a "Pay-direct" button, and the like (not shown in FIG. 4). Subsequently, Pay-Direct Assistant 110 automatically navigates the user to a biller website, such as biller website 114a, of the selected biller.

Figure 5:
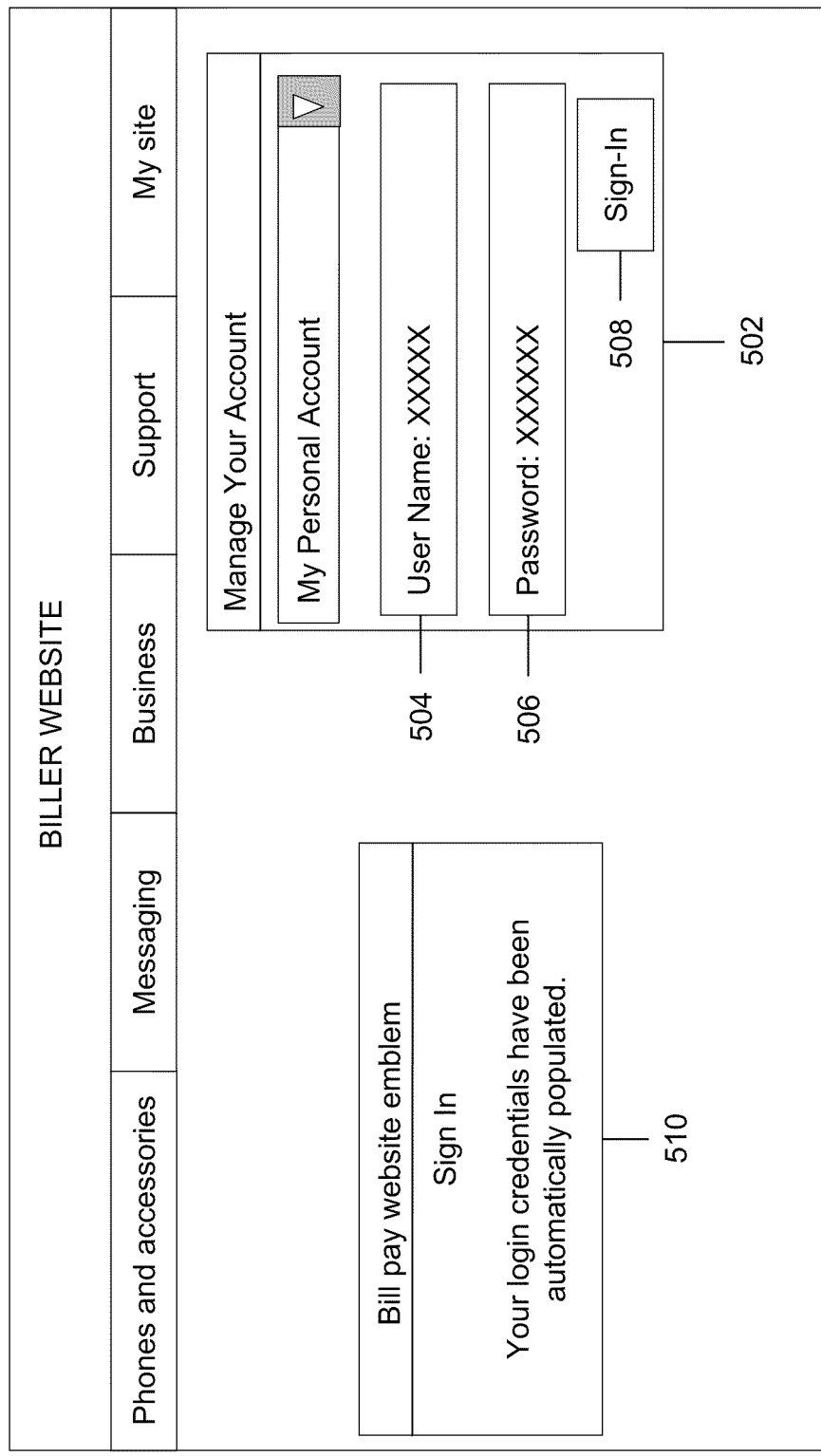
FIG. 5 illustrates an exemplary user interface of the biller website illustrating automatic filling of user authentication information, in accordance with the embodiment of the invention.

FIG. 5 illustrates an exemplary user interface of biller website 114a illustrating automatic filling of user authentication information, in accordance with the embodiment of the invention. When Pay-Direct Assistant 110 navigates the user to biller website 114a, a user authentication web page is displayed where the user provides user authentication information for authorization prior to accessing biller website 114a. In an embodiment of the present invention, a user authentication section 502 is displayed which includes a username field 504 and a password field 506. Pay-Direct Assistant 110 dynamically fetches the corresponding user authentication information to be filled in username field 504 and password field 506 from bill pay server 108. Username field 504 and password field 506 are then automatically populated by Pay-Direct Assistant 110 without a user input. Thereafter, the user selects a "Sign-In" button 508 to proceed with the authorization on biller website 114a. In another embodiment of the present invention, Pay-Direct Assistant 110 automatically triggers "Sign-In" button 508 without a user input, as soon as the user authentication information is populated in username field 504 and password field 506.

In a preferred embodiment of the present invention, Pay-Direct Assistant 110 displays a messages panel 510 on biller website 114a. Messages panel 510 displays one or more promotional and informational messages from bill pay website 104 and biller website 114a to the user. Further, messages panel 510 also displays an emblem associated with bill pay website 104. The details of the promotional and informational messages have been discussed in the explanation of FIG. 2.

Figure 6:
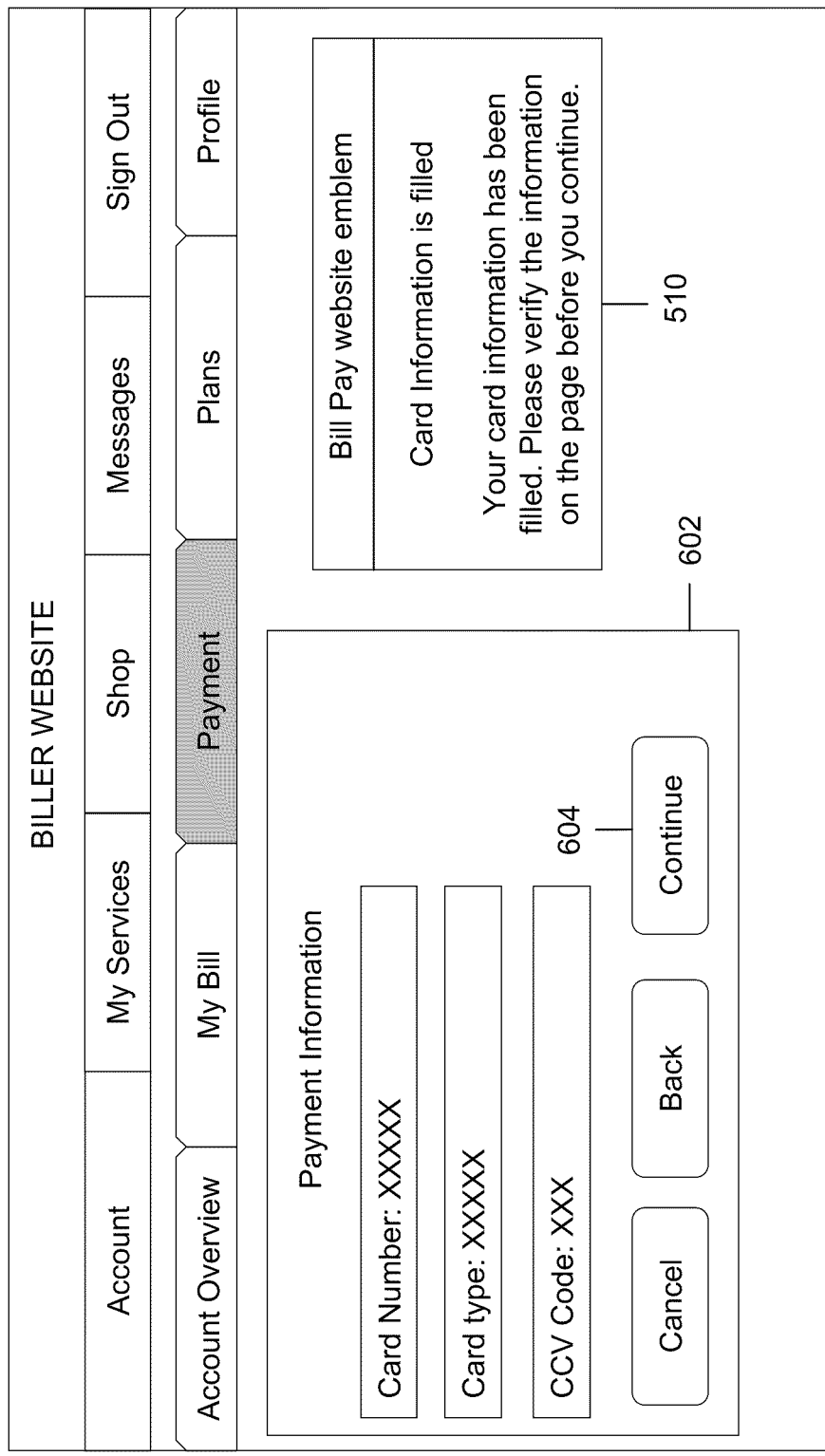
FIG. 6 illustrates an exemplary user interface of the biller website illustrating automatic filling of payment information, in accordance with the embodiment of the invention.

FIG. 6 illustrates an exemplary user interface of biller website 114a illustrating automatic filling of payment information, in accordance with the embodiment of the invention. Once the user is authorized by biller website 114a, Pay-Direct Assistant 110 automatically routes the user directly to one or more payment related web pages on biller website 114a where the payment is to be made. In another embodiment of the present invention, the user may manually navigate to the one or more payment related web pages. Further, a payment information section 602 is displayed on biller website 114a.

Pay-Direct Assistant 110 fetches payment information from bill pay server 108. The payment information is then automatically populated in payment information section 602 by Pay-Direct Assistant 110 without requiring a user input. Hereafter, the user may only need to populate the CVV code. Messages panel 510 may display a message instructing the user to select a "Continue" button 604 to proceed with the payment. In another embodiment of the present invention, Pay-Direct Assistant 110 automatically triggers "Continue" button 604 without a user input, as soon as the payment information is populated in payment information section 602. Further, the payment information may be made read-only after a mode of payment/card type is populated by Pay-Direct Assistant 110 in payment information section 602.

In a preferred embodiment of the present invention, while the user is navigating on the one or more payment related web pages on biller website 114a, Pay-Direct Assistant 110 initiates a dynamic extraction of a plurality of attributes associated with the online payment. The plurality of attributes include, but are not limited to, amount paid, date paid, digits of a payment card number, a card type, a payment reference issued by the biller, or any other information of the user. In another embodiment of the present invention, the plurality of attributes may include, but are not limited to, amount paid, date paid, a scheduled future date of payment, a bank account number, a bank account type, a routing number, a payment reference number, or any other information of the user.

Figure 7:
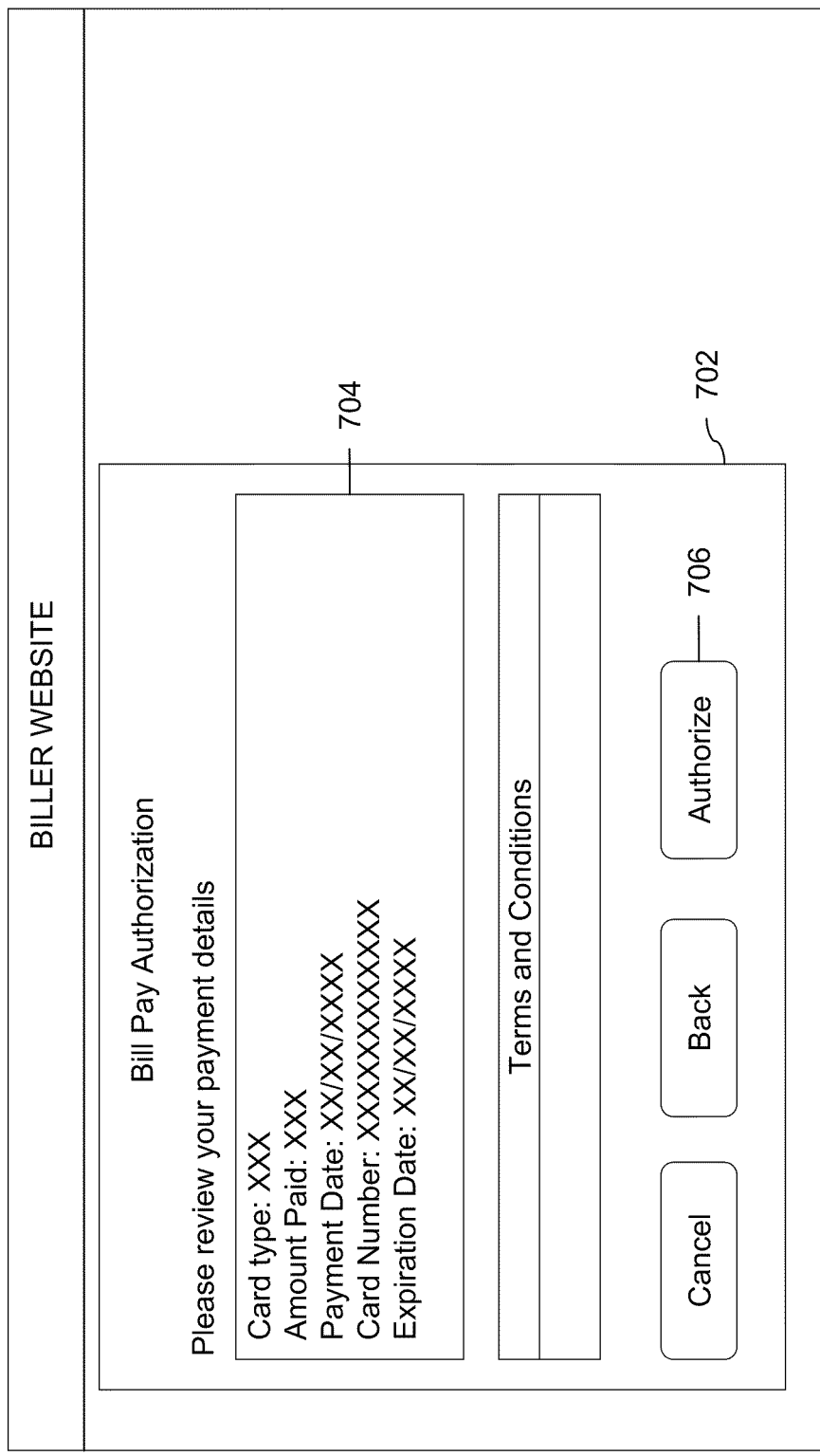
FIG. 7 illustrates an exemplary user interface of the biller website illustrating authorization of an online payment, in accordance with the embodiment of the invention.

FIG. 7 illustrates an exemplary user interface of biller website 114a illustrating authorization of an online payment, in accordance with the embodiment of the invention. Biller website 114a displays a bill pay authorization section 702 that includes a summary section 704. Summary section 704 displays the plurality of attributes associated with the online payment. Bill pay authorization section 702 may also display other features, such as terms and conditions, an option of saving the card for future payments, and the like.

When the user selects an "Authorize" button 706 for verifying the online payment, Pay-Direct Assistant 110 completes the dynamic extraction of the plurality of attributes from payment information section 602 that was initiated prior to selecting "Authorize" button 706. In another embodiment of the present invention, "Authorize" button 706 may be replaced by a "Check Details" button, a "Submit" button, a "Authenticate" button, and the like (not shown in FIG. 7). In accordance with the embodiment of the present invention, Pay-Direct Assistant 110 dynamically recognizes these variations of "Authorize" button 706, thereby proceeding with the user's authorization.

Pay-Direct Assistant 110 also saves a copy of summary section 704 on bill pay server 108. Once the payment is authorized by the user, biller website 114a debits the payment from the user's account. In an embodiment of the present invention, when the payment is made via a debit card, biller website 114a immediately debits the payment is from the user's account. In another embodiment of the present invention, when the payment is made via a credit card, the payment may be processed either immediately or on the next day depending on the processing time taken by biller website 114a. In yet another embodiment of the present invention, when the payment is made via an ACH account, the payment may take 2-3 days before being debited from the user's account. In still another embodiment of the present invention, payment may also be made via other alternate payment methods such as PayPal, Google Checkout, and Bill Me Later. Further, the payment may be debited either immediately or on the next day depending on the processing time taken by the companies offering the alternate payment methods. However, irrespective of the mode of payment utilized by the user, the receipt of payment is immediately acknowledged by biller website 114a.

Figure 8:
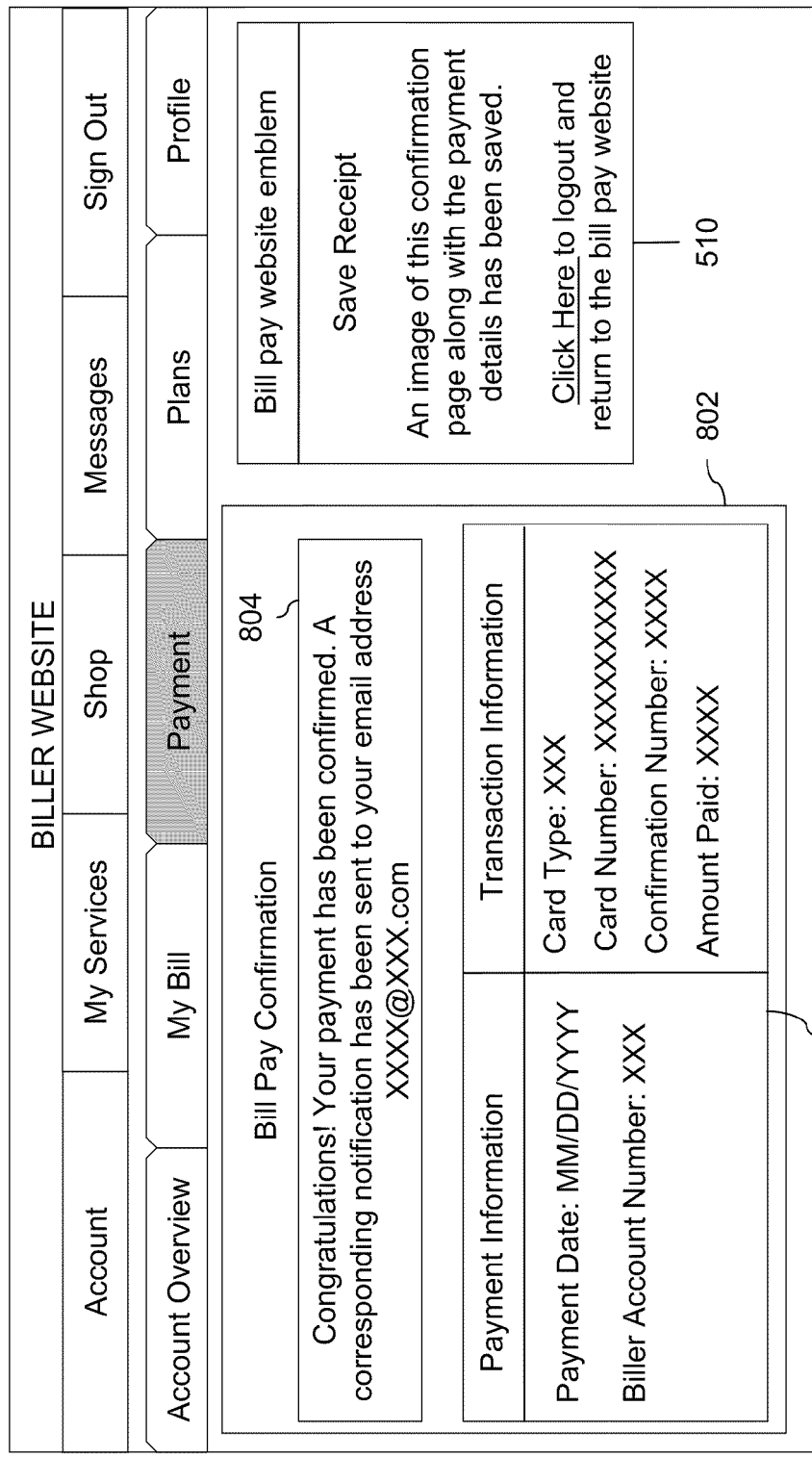
FIG. 8 illustrates an exemplary user interface of the biller website illustrating confirmation of a completed online payment, in accordance with the embodiment of the invention.

FIG. 8 illustrates an exemplary user interface of biller website 114a illustrating confirmation of a completed online payment, in accordance with the embodiment of the invention. Biller website 114a displays a bill pay confirmation section 802 that further encompasses a confirmation notification section 804 and a confirmation information section 806. Confirmation notification section 804 displays a note confirming the completion of the online payment. Further, the note may also denote that an e-mail confirming the online payment has been sent to the user's e-mail address. In another embodiment of the present invention, the note may also denote that a text message sent through short message service (SMS), confirming the online payment has been sent to the user's mobile number. Confirmation information section 806 displays the information pertaining to the online payment, such as a confirmation number, user's card number, payment date and the like. In a preferred embodiment of the present invention, Pay-Direct Assistant 110 saves a copy of the biller website 114a indicating the confirmation of the completed online payment. In another embodiment of the present invention, Pay-Direct Assistant 110 may only save a copy of bill pay confirmation section 802 on bill pay server 108.

In a preferred embodiment of the present invention, when the user selects a "Click Here" message displayed in messages panel 510, Pay-Direct Assistant 110 determines that the payment has been completed and subsequently the user is logged-out from biller website 114a. Pay-Direct Assistant 110 then routes the user back to bill pay website 104. In another embodiment of the present invention, bill pay confirmation section 802 may be displayed for a predefined number of seconds and then the user is automatically routed back to bill pay website 104 without selecting the "Click Here" message. In yet another embodiment of the present invention, a "Sign-out" button may be displayed on biller website 114a which when selected by the user, logs the user out from biller website 114a. In such a scenario, messages panel 510 displays an informational message prompting the user to click on the "Sign-out" button.

Figure 9A:
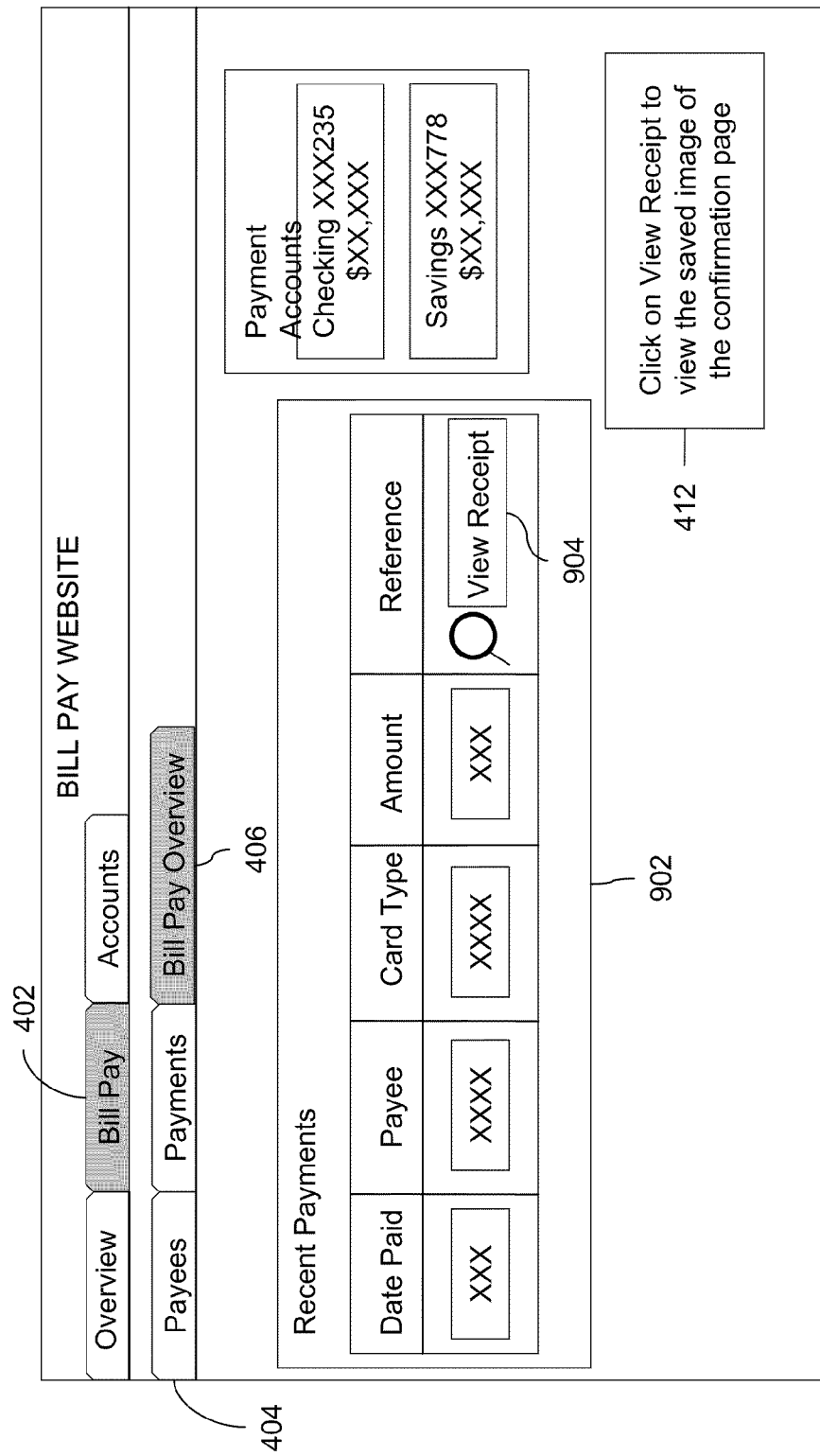
FIGS. 9A and 9B illustrate exemplary user interfaces of the bill pay website illustrating viewing a receipt of the completed online payment, in accordance with the embodiment of the invention.
Figure 9B:
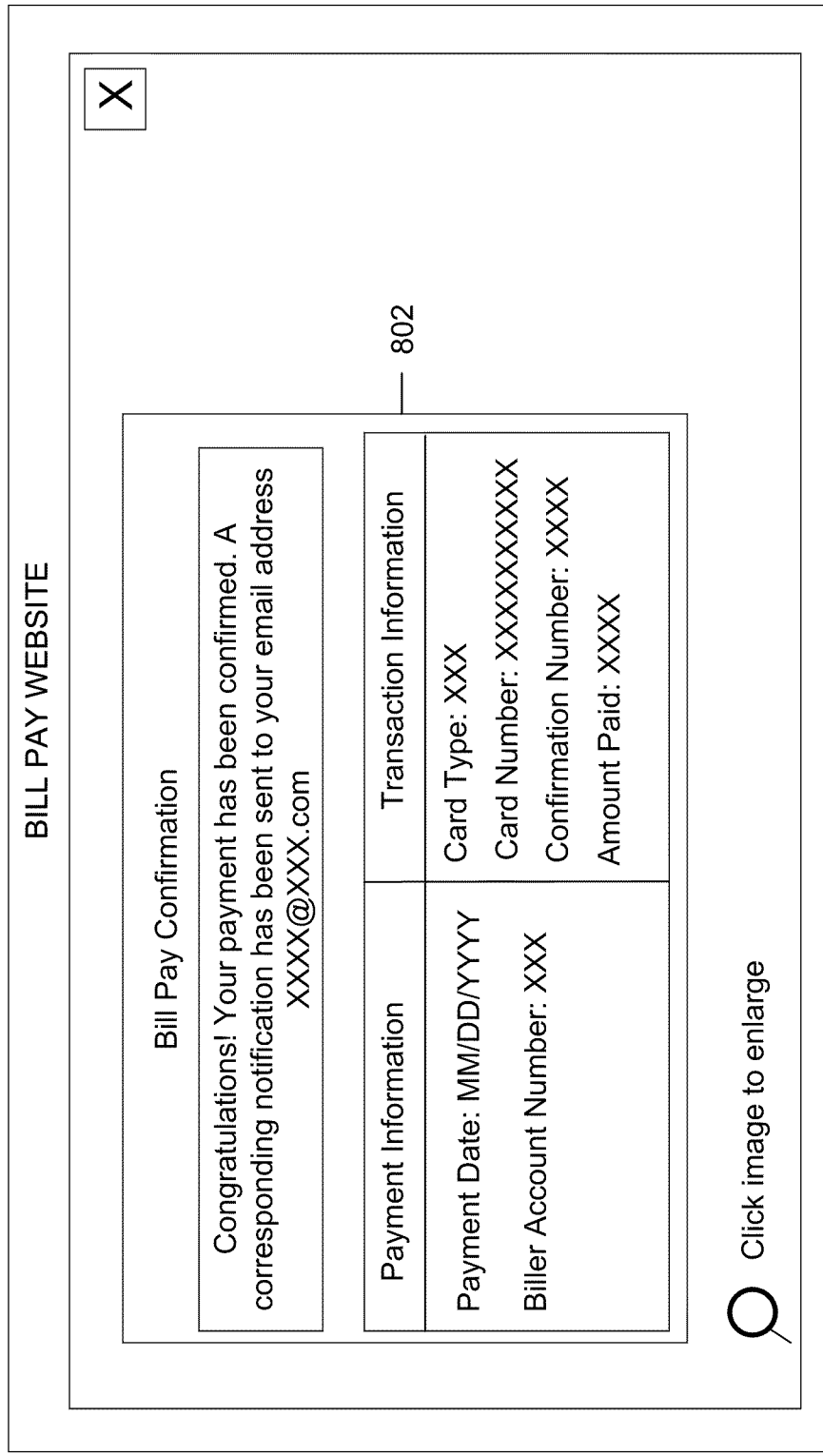

FIGS. 9A and 9B illustrate exemplary user interfaces of bill pay website 104 illustrating viewing a receipt of the completed online payment, in accordance with the embodiment of the invention. Once the payment is authorized and debited from the user's account by biller website 114a, and Pay-Direct Assistant 110 has recognized the payment confirmation page served up by biller website 114a, Pay-Direct Assistant 110 routes the user back to bill pay website 104. In FIG. 9A, a web page corresponding to a "Bill Pay Overview" tab 406 is depicted. A recent payments section 902 is displayed on the web page which includes the details of the recently made payments to the payees/billers. A "View Receipt" button 904 is displayed corresponding to each entry of the recently made payments. In another embodiment of the present invention, "View Receipt" button 904 may be replaced by a "Reference" button, a "Show Receipt" button, a "View Confirmation" button, or the like (not shown in FIG. 9A). In accordance with the embodiment of the present invention, Pay-Direct Assistant 110 recognizes these variations of "View Receipt" button 904.

In FIG. 9B, when the user selects "View Receipt" button 904, Pay-Direct Assistant 110 fetches the copy of bill pay confirmation section 802 and displays on bill pay website 104. As described in FIG. 8, bill pay confirmation section 802 displays a note confirming the completion of the online payment. Further, bill pay confirmation section 802 also displays a confirmation number for the online payment in addition to user's card number, amount paid, card type, and the like. In another embodiment of the present invention, the entire copy of the biller website 114a (FIG. 8) indicating the confirmation of the completed online payment may be displayed.

In an embodiment of the present invention, the copy of bill pay confirmation section 802 is displayed in the same GUI window of bill pay website 104. In another embodiment of the present invention, the copy of bill pay confirmation section 802 is displayed in a separate GUI window. Further, operations such as enlarge, resize, move, save, or print may be performed on the copy of bill pay confirmation section 802.

In yet another embodiment of the present invention, the copy of bill pay confirmation section 802 is stored in the mailbox of the user at bill pay website 104. It may be apparent to a person skilled in the art that bill pay website 104 assigns a separate mailbox to each user such that the mailbox gets activated whenever the user logs-in to bill pay website 104.

Additionally, a copy of summary section 704 may also be displayed to the user. As described in FIG. 7, summary section 704 displays the plurality of attributes associated with the online payment, such as such as amount paid, card number, and the like. In accordance with the embodiment, the user may concurrently view the copy of summary section 704 and the copy of bill pay confirmation section 802.

The method and the system described above have numerous advantages. The present invention facilitates a user to initiate an online payment at a biller website from within online bill pay service of a bill pay website, such as bank websites, credit card issuer websites, card networks' websites, and websites of companies offering payment services. The present invention also facilitates the user to perform an online payment using a card issued by the banks or any other financial institution. The user can also accrue reward points and cash backs using the card. The online payment may also be performed using a credit card, a debit card, or a prepaid card. In addition, the online payment is instantly acknowledged by the biller. The present invention also assists the user while conducting an online payment by automatically populating the user authentication information and payment information at the biller website, and saving the receipt of a completed online payment. Also, the present invention consolidates the biller information and the payment information at a bill pay server of the bill pay website.

The method and system for performing online payment related activities directly at biller websites from within a bill pay website using a browser application, as described in the present invention, may be embodied in the form of a computer system. Typical examples of a computer system include a general-purpose computer, a programmed microprocessor, a micro-controller, a peripheral integrated circuit element, and other devices or arrangements of devices that are capable of implementing the steps that constitute the method for the present invention.

The computer system typically comprises a computer, an input device, and a display unit. The computer typically comprises a microprocessor, which is connected to a communication bus. The computer also includes a memory, which may include a Random Access Memory (RAM) and a Read Only Memory (ROM). Further, the computer system comprises a storage device, which can be a hard disk drive or a removable storage drive such as a floppy disk drive and an optical disk drive. The storage device can be other similar means for loading computer programs or other instructions into the computer system.

The computer system executes a set of instructions (program instruction means) that are stored in one or more storage elements to process input data. These storage elements can also hold data or other information, as desired, and may be in the form of an information source or a physical memory element present in the processing machine. Exemplary storage elements include a hard disk, a DRAM, an SRAM, and an EPROM. The storage element may be external to the computer system and connected to or inserted into the computer, to be downloaded at or prior to the time of use. Examples of such external computer program products are computer-readable storage mediums such as CD-ROMS, Flash chips, and floppy disks.

The set of instructions may include various commands that instruct the processing machine to perform specific tasks such as the steps that constitute the method for the present invention. The set of instructions may be in the form of a software program. The software may be in various forms such as system software or application software. Further, the software may be in the form of a collection of separate programs, a program module with a large program, or a portion of a program module. The software may also include modular programming in the form of object-oriented programming. The software program that contains the set of instructions can be embedded in a computer program product for use with a computer, the computer program product comprising a non transitory computer usable medium with a computer readable program code embodied therein. Processing of input data by the processing machine may be in response to users' commands, results of previous processing, or a request made by another processing machine.

The modules described herein may include processors and program instructions that are used to implement the functions of the modules described herein. Some or all the functions can be implemented by a state machine that has no stored program instructions, or in one or more Application-specific Integrated Circuits (ASICs), in which each function or some combinations of some of the functions are implemented as custom logic.

While the various embodiments of the invention have been illustrated and described, it will be clear that the invention is not limited only to these embodiments. Numerous modifications, changes, variations, substitutions, and equivalents will be apparent to those skilled in the art, without departing from the spirit and scope of the invention.

What is claimed is:

1. A method for performing an online payment related activity, the method comprising the steps of:
    (a) activating a browser application at a bill pay website when a user logs-in at the bill pay website, wherein the browser application integrates with the bill pay website to facilitate online payment at one or more biller websites;
    (b) selecting a biller associated with a biller website at the bill pay website, wherein the online payment is to be made at the biller website;
    (c) automatically navigating the user from the bill pay website to the biller website;
    (d) entering credentials automatically to login into the biller website, wherein the login credentials are stored at the bill pay website;
    (e) navigating the user to one or more payment related web pages on the biller website;
    (f) entering payment information in the one or more payment related web pages without a user input, wherein the payment information is stored at the bill pay website; and
    (h) navigating the user back to the bill pay website on completion of the online payment at the biller website.

2. The method of claim 1, wherein the bill pay website is associated with a financial institution, wherein the financial institution corresponds to a bank or a payment card issuing authority.

3. The method of claim 1, wherein the step of automatically navigating the user to the biller website further comprises:
    (a) displaying an emblem of the bill pay website on the biller website; and (b) displaying a messages panel for communicating information to the user on the biller website, the information assisting the user in performing the online payment related activity.

4. The method of claim 3, wherein the step of communicating information to the user on the biller website further comprises communicating information based on one or more web pages displayed on the biller website, wherein the one or more web pages comprise at least one of a user authentication web page, a web page for making an online payment, and a web page for confirming the online payment.

5. The method of claim 3 further comprising the step of displaying one or more promotional messages to the user on the messages panel.

6. The method of claim 1 further comprising the step of rendering Graphical User Interface (GUI) on the bill pay website and the one or more biller websites, the GUI being determined based on the context of the browser.

7. The method of claim 1 further comprising storing a plurality of information data-points corresponding to each of the one or more biller websites.

8. The method of claim 1, wherein the step of automatically navigating the user to the biller website further comprises:
 (a) displaying a user authentication web page on the biller website, the user authentication web page requesting user authentication information; and
 (b) entering the user authentication information on the user authentication web page without a user input, the entering being performed by the browser application, wherein entering the user authentication information facilitates authenticating the user with the biller website based on the user authentication information.

9. The method of claim 8 further comprising the steps of:
 (a) monitoring if the user enters new user authentication information on the user authentication web page, the monitoring being performed by the browser application; and
 (b) storing the new user authentication information, the storing being performed by the browser application, wherein the new user authentication information facilitates the biller website to authenticate the user.

10. The method of claim 1, wherein the payment information corresponds to at least one of credit card information, ACH information, debit card information, and prepaid card information.

11. The method of claim 1 further comprising completing the online payment related activity after the payment information has been entered, wherein the step of completing the online payment related activity further comprises:
 (a) extracting a plurality of attributes associated with the online payment related activity dynamically from the one or more payment related web pages, the extraction being performed by the browser application; and
 (b) storing the plurality of attributes.

12. The method of claim 11, wherein the plurality of attributes comprises at least one of amount paid, date paid, a payment account number, a card type, a payment reference issued by the biller, the scheduled future date of payment, a bank account number, a bank account type, and a routing number.

13. The method of claim 1 further comprising the step of capturing a copy of the one or more payment related web pages, wherein the copy is stored in a predefined format.

14. The method of claim 1 further comprising the step of storing a receipt of a completed online payment related activity, wherein the receipt is stored in a predefined format.

15. The method of claim 1, wherein the step of navigating the user back to the bill pay website without a user input further comprises maintaining at the browser application a communication link to the bill pay website.

16. The method of claim 1 further comprising the step of de-activating the browser application when the user logs-out of the bill pay website.

17. A non-transitory computer program product for use with a computer, the computer program product comprising a computer usable medium having a computer readable program code embodied therein for interfacing a bill pay website with one or more biller websites for performing an online payment related activity, the computer readable program code when used by the computer enables communication with a bill pay server of the bill pay website over a network, the computer readable program code is used by the computer to:
 (a) activate a browser application at the bill pay website when a user logs-in at the bill pay website, wherein the browser application integrates with the bill pay website to facilitate online payment at the one or more biller websites;
 (b) navigate the user automatically to a biller website of a biller, the biller being selected by the user at the bill pay website wherein the navigation to the biller website facilitates navigating the user to one or more payment related web pages on the biller website;
 (c) enter payment information in the one or more payment related web pages without a user input, wherein the payment information is stored at the bill pay website; and
 (d) navigating the user back to the bill pay website on completion of the online payment at the biller website.

18. The non-transitory computer program product of claim 17, wherein the computer readable program code is further used by the computer to determine the context of the browser.

19. The computer program product of claim 17, wherein the computer readable program code is further used by the computer to render GUI on the bill pay website and the one or more biller websites.

20. The computer program product of claim 17, wherein the computer readable program code is further used by the computer to communicate information to the user on the one or more biller websites, the information assisting the user in performing the online payment related activity.

21. The computer program product of claim 17, wherein the computer readable program code is further used by the computer to communicate one or more promotional messages to the user on the one or more biller websites.

22. The computer program product of claim 17, wherein the computer readable program code is further used by the computer to store a plurality of information data-points corresponding to each of the one or more biller websites.

23. The computer program product of claim 17, wherein the computer readable program code is further used by the computer to enter user authentication information on a user authentication web page without a user input, the user authentication web page being displayed on the biller website.

24. The computer program product of claim 23, wherein the computer readable program code is further used by the computer to determine if the user enters new user authentication information on the user authentication web page.

25. The computer program product of claim 24, wherein the computer readable program code is further used by the computer to store the new user authentication information on the bill pay server.

26. The computer program product of claim 17, wherein the computer readable program code is further used by the computer to:
(a) extract a plurality of attributes associated with the online payment related activity dynamically from the one or more payment related web pages; and
(b) store the plurality of attributes on the bill pay server.

27. The computer program product of claim 26, wherein the computer readable program code is further used by the computer to:
(a) capture a copy of the one or more payment related web pages; and
(b) store the copy of the one or more payment related web pages on the bill pay server.

28. The computer program product of claim 26, wherein the computer readable program code is further used by the computer to store a receipt of a completed online payment related activity on the bill pay server.

29. The computer program product of claim 17, wherein the navigating the user back to the bill pay website without a user input further comprises maintaining at the browser application a communication link to the bill pay website.

30. The computer program product of claim 17, wherein the computer readable program code is further used by the computer to de-activate the browser application when the user logs-out of the bill pay website.

31. A system for performing an online payment related activity, the system comprising:
(a) a browser application, wherein the browser application is activated when a user logs-in to a bill pay website by entering log-in credentials, wherein the browser application integrates with the bill pay website to facilitate the online payment at one or more biller websites, wherein the browser application is configured to:
  (i) interface the bill pay website and the one or more biller websites;
  (ii) assist in performing the online payment related activity at a selected biller website of the one or more biller websites from within the bill pay website; and
  (iii) populate payment information on one or more payment information web pages displayed on the selected biller website without a user input, wherein the payment information is stored at the bill pay website;
(b) a browser application server in communication with the browser application, wherein the browser application server is configured to:
  (i) control the browser application; and
  (ii) store a plurality of information data-points corresponding to each of the one or more biller websites; and
(c) a bill pay server in communication with the bill pay website, wherein the bill pay server is configured to store user authentication information, payment information, a plurality of attributes associated with the online payment related activity, a copy of one or more payment related web pages, and a receipt of a completed online payment related activity.

32. A computer program product for use with a computer, the computer program product comprising a computer usable medium having a computer readable program code embodied therein for performing an online payment related activity, the computer readable program code comprising:
(a) a program instruction for activating a browser application at a bill pay website when a user logs-in at the bill pay website, wherein the browser application integrates with the bill pay website to facilitate online payment at one or more biller websites;
(b) program instruction for automatically navigating the user from the bill pay website to a biller website of a biller, the biller being selected by the user at the bill pay website;
(c) a program instruction for entering credentials automatically to login into the selected biller website, wherein the login credentials are stored at the bill pay website;
(d) a program instruction for entering payment information in one or more payment related web pages without a user input, the one or more payment related web pages being displayed on the biller website; and
(f) a program instruction for navigating the user back to the bill pay website on completion of the online payment at the biller website.

33. The computer program product of claim 32, wherein the program instruction for automatically navigating the user to the biller website further comprises:
(a) a program instruction for displaying an emblem of the bill pay website on the biller website; and
(b) a program instruction for displaying a messages panel for communicating information to the user on the biller website, the information assisting the user in performing the online payment related activity.

34. The computer program product of claim 33 further comprising displaying a program instruction for one or more promotional messages to the user on the messages panel.

35. The computer program product of claim 32 further comprising a program instruction for rendering Graphical User Interface (GUI) on the bill pay website and the one or more biller websites, the GUI being determined based on the context of the browser.

36. The computer program product of claim 32 further comprising a program instruction for storing a plurality of information data-points corresponding to each of the one or more biller websites.

37. The computer program product of claim 32, wherein the program instruction for automatically navigating the user to the biller website further comprises a program instruction for entering user authentication information on a user authentication web page without a user input, the user authentication web page being displayed on the biller website, the user authentication web page requesting the user authentication information, wherein the user is authenticated by the biller website based on the user authentication information.

38. The computer program product of claim 37 further comprising:
(a) a program instruction for monitoring if the user enters new user authentication information on the user authentication web page; and
(b) a program instruction for storing the new user authentication information, wherein the user is authenticated by the biller website based on the new user authentication information.

39. The computer program product of claim 32, wherein the program instruction for completing the online payment related activity further comprises:
(a) a program instruction for extracting a plurality of attributes associated with the online payment related activity dynamically from the one or more payment related web pages, the extraction being performed by the browser application; and
(b) a program instruction for storing the plurality of attributes.

40. The computer program product of claim 32 further comprising a program instruction for capturing a copy of the one or more payment related web pages, wherein the copy is stored in a predefined format.

41. The computer program product of claim 32 further comprising a program instruction for storing a receipt of a completed online payment related activity, wherein the receipt is stored in a predefined format.

42. The computer program product of claim 32, wherein the program instruction for navigating the user back to the bill pay website without a user input further comprises a program instruction for maintaining at the browser application a communication link to the bill pay website.

43. The computer program product of claim 32 further comprising a program instruction for de-activating the browser application when the user logs-out of the bill pay website.

* * * * *